United States Patent
Laverty et al.

(10) Patent No.: US 6,633,890 B1
(45) Date of Patent: Oct. 14, 2003

(54) METHOD FOR WASHING OF GRAPHIC IMAGE FILES

(76) Inventors: Timothy A. Laverty, 8515 Linden Ave. North, Seattle, WA (US) 98103; Cory E. Klatt, 14325 63$^{rd}$ Ave. West, Edmunds, WA (US) 98026; Brent A. Krum, 15908 NE. 107$^{th}$ Way, Redmond, WA (US) 98052

( * ) Notice: Subject to any disclaimer, the term of this patent is extended or adjusted under 35 U.S.C. 154(b) by 0 days.

(21) Appl. No.: 09/480,334

(22) Filed: Jan. 10, 2000

Related U.S. Application Data

(60) Provisional application No. 60/152,521, filed on Sep. 3, 1999.

(51) Int. Cl.$^7$ .................................................. G06K 1/00
(52) U.S. Cl. ..................... 707/203; 358/1.13; 358/1.15; 358/1.9; 707/10; 707/104.1; 715/500; 715/513; 715/527
(58) Field of Search .......................... 707/10, 203, 500, 707/513, 527, 104.1; 358/1.13, 1.15, 1.9; 715/500, 513, 527

(56) References Cited

U.S. PATENT DOCUMENTS

| | | |
|---|---|---|
| 5,029,115 A | 7/1991 | Geraci |
| 5,113,356 A | 5/1992 | Nickell et al. |
| 5,287,194 A | 2/1994 | Lobiondo |
| 5,581,667 A | 12/1996 | Bloomberg |
| 5,625,766 A | 4/1997 | Kauffman |
| 5,644,720 A | 7/1997 | Boll et al. |
| 5,666,543 A | 9/1997 | Gartland |
| 5,713,032 A | 1/1998 | Spencer |
| 5,761,392 A | 6/1998 | Yacoub et al. |

(List continued on next page.)

FOREIGN PATENT DOCUMENTS

| | | | |
|---|---|---|---|
| EP | 0537391 A1 | 4/1993 | ........... G06F/15/24 |
| EP | 0605210 | 7/1994 | |
| EP | 0692763 | 1/1996 | |
| EP | 0 782 068 | * 2/1997 | ............. G06F/3/12 |
| EP | 0782068 A1 | 7/1997 | ............. G06F/3/12 |
| EP | 0837401 A2 | 4/1998 | ........... G06F/17/24 |
| EP | 0919909 | 6/1999 | |
| WO | WO98/08176 | 2/1998 | ........... G06F/17/60 |

OTHER PUBLICATIONS

Adobe System Incorporated, How to Create Adobe® PDF Files for Print and Press, Copyright 1998, pp. 1–53. <http://www.adobe.com/products/postscript/pdfs/highres_book.pdf>.*

Weiner, PostScript Quick Tips: Converting PostScript to EPS, copyright 1995, p. 1. <http://www.wiskit.com/postscript/quicktips/ps_to_eps.pdf>.*

(List continued on next page.)

*Primary Examiner*—Kim Vu
*Assistant Examiner*—Hung Pham
(74) *Attorney, Agent, or Firm*—Beyer Weaver & Thomas, LLP

(57) ABSTRACT

A method for producing normalized (or "washed") graphic image files that have a consistent file structure, the graphic image files thereafter being used to produce a consistent print ready file structure. A source, or unprocessed, image file is first converted into a vector-based medium file and stored. This vector-based medium includes a PDF file format, with the conversion routine using Adobe Distiller for producing PDF files. The vector-based medium file is thereafter retrieved and converted into a consistently structured file, which can be used by a variety of applications associated with a printing process. The consistent structure file includes PostScript, and in particular ASCII Level 1 PostScript. The washing routine is intended to be performed as an Prepress operation to creating the overlying print ready file, and can be automated as needed. This Prepress operation can run on a farm service and managed by a master farm server.

29 Claims, 19 Drawing Sheets

U.S. PATENT DOCUMENTS

| | | | |
|---|---|---|---|
| 5,813,348 | A | 9/1998 | Zingher |
| 5,848,415 | A | 12/1998 | Guck |
| 5,911,776 | A | 6/1999 | Guck |
| 5,988,899 | A | 11/1999 | Benson et al. |
| 6,011,905 | A | 1/2000 | Huttenlocher et al. |
| 6,012,070 | A | 1/2000 | Cheng et al. |
| 6,049,390 | A | 4/2000 | Notredame et al. |
| 6,055,064 | A | 4/2000 | Lifshitz et al. |
| 6,088,710 | A | 7/2000 | Dreyer et al. |
| 6,205,452 | B1 | 3/2001 | Warmus et al. |
| 6,229,623 | B1 | 5/2001 | VerMurlen |
| 6,247,011 | B1 * | 6/2001 | Jecha et al. .................... 707/9 |

OTHER PUBLICATIONS

Adobe System Incorporated, PostScript Language Reference Manual, Addison–Wesley Publishing Company, Inc., Copyright 1990, Chapter 2, pp. 11–22. <http://partners.adobe.com/asn/developer/pdfs/tn/psrefman.pdf>.*

Adobe System Incorporated, Guidelines for Using Adobe Acrobat 3.0 for Procution Printing, Copyright 1996, pp. 1–2. <http://access.adobe.com/browser/netscape/annots_move.PDF>.*

Beale, Stephen, "Get Prepress Ready PDFs from QuarkXPress", Macworld, Jun. 1998, Macworld Commun., USA, vol. 15, No. 6, pp. 101–103.

Fuchs, W. et al., "Darstellung, Konvertierung und Farbreduktion von Rasterbildern auf Basis eines universellen Zwishchenformates", Mar. 1994, IT–TI Informationstechnik und Technische informatik, Munchen, DE, pp. 30–37.

IBM Technical Disclosure Bulletin, "Build–A–Check", 8 IBM Corp. 1991, vol. 34, No. 6, Nov., 1991.

Adobe System Incorporated, "How to Create Adobe® PDF Files for Print and Press", Copyright 1998, pp. 1–53. <htt;://www.adobe.com/products/postscript/pdfs/highres_book-.pdf>.

Weiner, PostScript Quick Tips: Converting PostScript to EPS, copyright 1995, p. 1. <http://www/wiskit.com/postscript/quicktips/ps_to_eps.pdf>.

PostScript Language Reference Manual, Second Edition Adobe Systems Inc. Addison–Wesley Publishing Co., Inc.Dec. 1990. ISBN 0–201–18127–4.

Lawsuit: ImageX, Inc. vs. iPrint Technologies, "Complaint for Patent Infringement of U.S. patent No. 6,429,947".

* cited by examiner

DSC Header For Unwashed EPS File (with EPS file embedded in it)

%IPS-Adobe-2.0 EPSF-1.2
%%Title: UNTITLED-2
%%Creator: FreeHand 8.0
%%CreationDate: Tue Aug 31 09:46:24 1999
%%BoundingBox: 0 0 146 146
%%FHPathName:C:\WINNT\Profiles\timl\Desktop\UNTITLED-2
%ALDOriginalFile:C:\WINNT\Profiles\timl\Desktop\UNTITLED-2
%ALDBoundingBox:-149 -445 463 347
%%FHPageNum:1
%%DocumentSuppliedResources: procset Altsys_header 4.0
%%ColorUsage: Color
%%DocumentProcessColors: Black
%%EndComments
%%BeginResources: procset Altsys_header 4.0

Figure 13
(Prior Art)

Washed Print EPS file header and footer

%IPS-Adobe-3.0 EPSF-3.0
%%Title: (UNTITLED-2)
%%Version: 1 2
%%Creator: (FreeHand 8.0)
%%CreationDate: (D:19990831161926)
%%DocumentDate: Clean7Bit
%%BoundingBox: 0 0 146 146
%%Pages: 0
%%DocumentProcessColors: (atend)
%%DocumentSuppliedResources:
%%+procset (Adobe Acrobat - PDF operators) 1.2 0
%%EndComments
%%BeginProlog
%%EndProlog
%%BeginSetup
...
Footer:
%%PageTrailer
%%EndPage
%%Trailer
%%DocumentProcessColors: Magenta Yellow Black
%%ImageX-WashStamp: 08-31-99 16:22:49
%%EOF

Figure 14

| Preview Parameters: | | Print Parameters: | |
|---|---|---|---|
| ASCII85EncodePages | False | ASCII85EncodePages | False |
| AutoRotatePages | 0 | AutoRotatePages | 0 |
| CompatibilityLevel | 1.2 | CompatibilityLevel | 1.2 |
| LZWEncodePages | False | LZWEncodePages | False |
| PreserveHalftoneInfo | False | PreserveHalftoneInfo | True |
| PreserveOPIComments | False | PreserveOPIComments | False |
| PreserveOverprintSettings | False | PreserveOverprintSettings | True |
| TransferFunctionInfo | 0 | TransferFunctionInfo | 0 |
| UCRandBGInfo | 1 | UCRandBGInfo | 0 |
| UseFlateCompression | True | UseFlateCompression | True |
| AntiAliasColorImages | False | AntiAliasColorImages | False |
| AutoFilterColorImages | True | AutoFilterColorImages | False |
| ColorConversionStrategy | 0 | ColorConversionStrategy | 0 |
| ColorImageDownsampleType | 0 | ColorImageDownsampleType | 0 |
| ColorImageFilter | 0 | ColorImageFilter | 0 |
| ColorImageResolution | 3600 | ColorImageResolution | 3600 |
| ConvertCMYKImagesToRGB | True | ConvertCMYKImagesToRGB | False |
| ConvertImagesToIndexed | False | ConvertImagesToIndexed | False |
| DownsampleColorImages | True | DownsampleColorImages | False |
| EncodeColorImages | True | EncodeColorImages | False |
| AntiAliasGrayImages | False | AntiAliasGrayImages | False |
| AutoFilterGrayImages | True | AutoFilterGrayImages | False |
| DownsampleGrayImages | True | DownsampleGrayImages | False |
| EncodeGrayImages | True | EncodeGrayImages | False |
| GrayImageDepth | -1 | GrayImageDepth | -1 |
| GrayImageDownsampleType | 0 | GrayImageDownsampleType | 0 |
| GrayImageFilter | 0 | GrayImageFilter | 0 |
| GrayImageResolution | Not Set | GrayImageResolution | 3600 |
| AntiAliasMonoImages | False | AntiAliasMonoImages | False |
| DownsampleMonoImages | True | DownsampleMonoImages | False |
| EncodeMonoImages | True | EncodeMonoImages | False |
| MonoImageDepth | -1 | MonoImageDepth | -1 |
| MonoImageDownsampleType | 0 | MonoImageDownsampleType | 0 |
| MonoImageFilter | 2 | MonoImageFilter | 1 |
| MonoImageResolution | Not Set | MonoImageResolution | 3600 |
| EmbedAllfonts | True | EmbedAllfonts | True |
| SubsetFonts | True | SubsetFonts | False |
| MaxSubsetPct | 100 | MaxSubsetPct | 0 |

Appendix A

| Preview/Print Parameters: | |
|---|---|
| PsLevel | 1 |
| OutputType | PDOutput_EPSNoPrev (Adobe PDF library constant) |
| IncBaseFonts | KIncludeNever (Adobe PDF library constant) |
| IncEmbeddedFonts | KIncludeOncePerDoc (Adobe PDF library constant) |
| incType1Fonts | KIncludeOncePerDoc (Adobe PDF library constant) |
| IncTrueTypeFonts | KIncludeOncePerDoc (Adobe PDF library constant) |
| IncCIDFonts | KIncludeOncePerDoc (Adobe PDF library constant) |
| incType3Fonts | KIncludeOnEveryPage (Adobe PDF library constant) |
| IncProcsets | KIncludeOncePerDoc (Adobe PDF library constant) |
| IncOtherResources | KIncludeOncePerDoc (Adobe PDF library constant) |
| emitTTFontsFirst. | false |
| EmitShowpage | false |
| EmitDSC | true |
| SetupProcsets | true |
| EmitColorSeps | true |
| EmitRawData | false |
| BinaryOK | false |
| TTasT42 | true |
| Scale | 100.0 |
| EmitHalftones | true |
| CenterCropBox | true |
| EmitPageRotation | false |
| EmitSeparableImagesOnly (RGB color conversion) | true for Preview; false for Print |
| EmitExtGState | true |

Appendix B

METHOD FOR WASHING OF GRAPHIC IMAGE FILES

RELATED APPLICATIONS

This application is related to U.S. patent application Ser. Nos. 09/480,821; 09/481,550; 09/480,332; 09/480,869; 09/480,881; 09/481,372; 09/480,335; 09/480,645; 09/480,185; 09/480,987; 09/480,980; 09/481,007; 09/480,820; 09/481,010; 09/480,333; and 09/480,866; filed on the same date herewith, which are hereby incorporated by reference. This application is also related to U.S. patent application Ser. No. 09/460,307 filed on Dec. 13, 1999, entitled "System and File Structure for Consistent Visual Medium Materials." This application also claims priority under 35 USC 119(e), to the Provisional application entitled "Color Washing of Graphic Image Files," which was filed on Sep. 3, 1999, and assigned application No. 60/152,521.

BACKGROUND OF THE INVENTION

1. Field of the Invention

The present invention relates to a system and file structure for producing fast and consistent visual medium materials. In particular, a hosted applications server is used to host Prepress applications. One such Prepress application is a process used to wash graphical files before they are incorporated into a consistent Print Ready File (PRF) structure. Washing is done to ensure that Encapsulated PostScript (EPS) graphics are structured in a consistent format.

2. Description of the Prior Art

The existing methods of procuring printed business materials are characterized by cumbersome and labor-intensive procedures. These procedures carry with them certain inefficiencies and are often prone to error. For the majority of small to medium sized printers, the printing of business cards, stationery, and the like, entails (at a minimum) a time-consuming series of steps, which generally must be repeated every time a new order is placed.

The present system provides for the automated creation of a PRF, as described in the incorporated references. Unlike prior art systems, this PRF has been configured to contain all the necessary information for printing a particular job. Once created, the PRF can be sent to many different vendors, over a variety of different mediums, and can be used to produce a consistent print job result each time.

The consistent processing of the file is also due, in part, to the treatment of the various jobs coming into the system. In prior systems, jobs were sent to a server (or group of servers) and processed according to a certain priority queue. Often the priority queue proved to be inadequate to properly distribute the jobs among the various servers. A more centralized system for handling many different client tasks is therefore needed, with effective load balancing provided between the various servers.

One such centralized task, described in more detail herein, is color washing of the EPS (Encapsulated PostScript) files. Postscript is a programming language that describes the appearance of a printed page. It was developed by Adobe in 1985 and has become an industry standard for printing and imaging. All major printer manufacturers make printers that contain or can be loaded with Postscript software. Such software also runs on all major operating system platforms. A Postscript file can typically be identified by its ".ps" suffix. Postscript describes the text and graphic elements on a page to a blackand-white or color printer or other output device, such as a slide recorder, imagesetter, or screen display. Postscript handles industry-standard, scalable typefaces in the Type 1 and TrueType formats. Users can convert Postscript files to the Adobe Portable Document Format (PDF) using (for instance) the Adobe Distiller product. PDF files present the document's printed appearance on a display screen. Encapsulation is the inclusion within the file of all the resources needed for the file to be printed (or displayed). Other such centralized tasks might include creation, trapping, color separation, and imposition of Print Ready Files.

A set of business logic (or the like) can therefore be applied to a print job, in that the setup associated with such processes can be accomplished at the front-end by the user, when the user specifies the print job. The centralized server can thereafter take all of the setup data and generate a completed print job, or in other words, a complete PRF for use by a print vendor.

As described in the incorporated references, a PRF is comprised of a combination of graphical, text, and line elements. The graphical elements typically include EPS files. A number of available software tools can be used by a human operator to create, review, and edit EPS files. However, EPS files that ultimately come out of such software and Graphic Art products such as Illustrator, Quark, Pagemaker, or Photoshop all have certain differences, or eccentricities, which are difficult to account for and process on a consistent basis. Such differences might include the setting of parameters for fonts (i.e. leading, size, kerning), linescreen, angle, transfer functions (and other device specific PostScript operators), scaling of graphics, addition of spot colors, and so forth.

Still another resulting practice in creating files involves embedding EPS files within EPS files (and so forth), wherein such files are eventually included in the overall PRF. Such multi-layering of files can produce a tangled series of information, which can prove to be difficult to process when trying to parse color information (and the like) from the EPS file.

Referring now to FIG. 1, a prior art block diagram is shown of certain representative steps 100 which might be used by an human operator (or user) to create an EPS file. In step 102, the user creates and/or imports graphical elements into a Graphic Art application. In step 104, the user sets various parameters associated with the file, as per the particular interface associated with the Graphic Art application. The parameters might include information such as type, fonts, leading, scaling, and color separation. In step 106, the user outputs the EPS file using the Graphic Art program, which is often in a proprietary format. The prior art does not ensure referential integrity or consistent settings for color in such files. Software systems developed by different companies do not typically have a shared data structure for reference by the different applications.

The prior art does include Preflight checking and the like. Such Preflight checking analyzes and detects problems in EPS files. However, such Preflight checking methods do nothing to fix (or standardize) the EPS file results.

Accordingly, a solution is needed which will normalize the information used to produce an EPS file. In other words, the EPS file should be "washed." This will allow the various applications used to process a graphical file that will run in an automated environment wherein the color settings are set as policies, and can be managed, updated, and tested automatically. The policies can be stored in a central database. The washing process removes problems and anomalies, and creates an EPS file that can be commonly shared in known format. The format might include PostScript Level 1 code, with removal of incompatible operators, and a PostScript header that is consistent between various files.

SUMMARY OF THE INVENTION

In response to aforementioned costly, cumbersome and error-prone environment, the present invention utilizes certain technology, along with an interface medium such as the Internet, to offer a fully automated, efficient and cost-effective solution for producing print jobs and the like. The present invention reduces the number of times that human intervention is required in the process and thereby reduces labor intensity, labor cost, time, and high error rates. In particular, color washing of EPS files is performed as one Pre-press operation in order to provide a consistent format for graphical files.

According to one aspect of the present invention, the Farm system can be configured to provide load balancing aspects, in association with performing a variety of operations, and in association with processing jobs submitted by clients using the system. Each job is analyzed to provide an estimate of its relative impact on the overall system, based upon exemplary factors such as job size and CPU usage for each server. The Farm system is scalable, and is controlled via a single point of contact called the Master Farmer. As different jobs are queued up by the Master Farmer, different Farm services can be brought online to process these various jobs. Each job is handled by a particular Plot, and each Plot is controlled by a Field, which is specific to that Plot. A Farm service might control several Fields, and the Master Farmer might control several Farm services. Each different Plot is configured to run out-of-process from the Farm main process. This is to prevent crashes associated with one Plot. If a particular Farm service crashes, its jobs can be rerouted to other Farm services. When a client submits a particular job, the size of the job is used to estimate how long it will take to process. This estimate is returned to the client and updated periodically. In general, the Farm system utilizes very little overhead, and each Farm service can be configured to run any of the file processing tasks.

According to another aspect of the present invention, a number of different operations can be performed in the server network of the present invention. In particular, the Farm service might host a variety of Prepress applications that are used in association with automatically creating and processing the PRF. The presently described (color) washing operation is one of several Prepress operations that can be automated in this fashion, namely by hosting the application on a server or other networked computer, and maintaining control of its operations as part of a distributed Prepress software operation. Other operations might include, but are not limited to, creation, trapping, color separation, and imposition, all in association with the Print Ready Files.

In order to automate the running of such Prepress operations, a series of communication links back to a centralized system are necessary. Certain operations are specified to be performed in order to create a PRF, and the present system thereby processes these automatically to create PRF. In prior systems, manual or discrete processes were performed on the file, by design houses, print shops, and the like. The processes were performed and recorded (or stored) back on a network or storage system. Each subsequent operation was then performed on the file by retrieving it, and returning to storage. Hence, in order to automate such Prepress operations, a system should have application server capability, and messaging capability about each particular application being run. Under such a system, a variety of applications can be run, but the CPU usage can be tracked according to job size, and the like. According to what kinds of files, and the size of the files to be run, load balancing can be performed.

Prior load balancing application servers would generally take any tasks placed on the network, and deal with emergency conditions as the criteria for passing work off to another server. Such systems generally do not know what applications are running on them (i.e. Word, Excel, etc.), but simply watch for the emergency conditions. When such conditions occur, tasks are shunted off to another server. In contrast, the present system manages ahead of the processes, and keeps track of what jobs and loads are being placed on the different servers comprising a system. The system employs knowledge of the different applications, and what kind of workload such applications will generate on a server. Such metadata is built into the present Farm system in determining how underlying Fields will allocate incoming jobs.

The washing Prepress operation can be described as follows: EPS is a file format used in Prepress operations. EPS contains the information required to create a printed document containing graphics images. Along with the imaging bits, EPS files contain a variety of other data pertaining to reproduction of the image, for digital display or for print. Such other data might include, but is not limited to, color selections, color settings, scaling of graphics, embedded fonts, and so forth. As a result of the variety of other data, certain problems are addressed and solved by the present invention in association with the automated processing of the documents having EPS files. Moreover, the use of EPS files is a specialized example in the generalized use of "consistent PostScript" Print Ready Files, as described in the incorporated references.

The present invention provides a process to normalize (or "wash") the information that might be shared between a variety of software applications working on a file. A shared data structure results. This permits such applications to run in an automated environment wherein the color settings are set as policies. The policies can be managed, updated and tested automatically. These policies can be stored in the ILIAD database. The washing process removes problems and anomalies, and creates an EPS file that is a "common denominator" EPS file. According to one aspect, all PostScript in this resulting file is converted to Level 1. Other Levels of PostScript might similarly be used. Incompatible operators are removed, and a PostScript header is created that is consistent and readable time after time.

Washing is therefore performed to provide EPS graphics that are structured in a consistent format. Among other things, washing can be used to: validate inks contained in the graphics as valid inks in a database (i.e. ILIAD, or otherwise); ensure that high resolution and low resolution versions of graphics contain the same inks; and to manipulate the size of low resolution graphics. The process of washing accomplishes such structuring of graphics in a consistent format by using Adobe Acrobat Distiller and the PDF library thereby associated with it. An EPS file is processed through Distiller, thereby creating a PDF. The PDF is then exported to a new PostScript file using the PDF library. The PDF library has the capability to rewrite the PDF format into a standard PostScript output.

Validation of inks is accomplished by parsing the standard exchange output Postscript file. Inks inside the file can be located and recorded. The inks are then checked against databased inks, and also against their low resolution/high resolution counterparts. In pre-washed EPS files, the various inks in the file can be located in different (and inconsistent) places throughout the file output structure. The present invention provides a significant advantage over such prior art systems, in that it would be extremely difficult to find and record inks in such a pre-washed EPS file.

The size of the low resolution graphics can also be manipulated by using the Distiller down-sampling capabilities. Distiller exposes an API, which can be used for manipulating the dpi (dot per inch) values of color, black and white, and grayscale images.

The resulting output from the automated washing process, as contrasted with the prior art includes, but is not limited to the following advantages:

(i) Washed EPS files are produced automatically by a hosted server application in an automated Prepress management system that is highly scalable; Unwashed EPS files are produced by human hands in error prone graphical art programs.

(ii) Washed EPS files produce PostScript in the same level. Any embedded files are converted to level 1, creating a common denominator for EPS files; Unwashed EPS files can produce level 3 PostScript embedded within level 1 or level 2 PostScript documents causing some RIPs to crash.

(iii) Washed EPS PostScript headers are rewritten with accurate information. Any downstream applications using a washed file can rely upon consistent header information; Unwashed EPS files result in some applications generating PostScript headers with erroneous and/or inaccurate information. Applications downstream cannot rely upon consistent head information.

(iv) Washed EPS files are validated for use in the ILIAD system; Unwashed EPS files are not validated and have the possibility of producing errors in the ILIAD system.

(v) Washed EPS files are tracked in the ILIAD system; Unwashed EPS files are not tracked.

(vi) Washed EPS files result in PostScript in an ASCII readable format; Unwashed EPS files can be in a binary, unreadable format.

According to one aspect of the present invention, herein provided is a method for processing an image file and producing a consistent structure for visual medium materials contained within the file, the method comprising: specifying source and destination file addresses on a storage medium; storing an unprocessed image file at the source address; retrieving the unprocessed image file and using at least a first conversion routine to thereby produce a vector-based medium file which is placed on the storage medium; retrieving the vector-based medium file and using at least a second conversion routine to produce a consistently structured file which is placed on the storage medium.

According to yet another aspect of the present invention, herein provided is a method to normalize the information in a file, as shared between a variety of software applications working on the file, the method comprising: forming a source Encapsulated PostScript (EPS) file, whereby the EPS file contains unstructured information required to create a printed document containing graphics images; converting the source EPS file to a Portable Document Format (PDF) file, whereby the file is structured using a PDF library of functions; converting the PDF file to a normalized EPS file having a shared data structure, whereby software applications can use the shared data structure to access the normalized file in a printing operation.

According to still another aspect of the present invention, load balancing of print jobs can be applied via analysis of the job size in relation to the processing capabilities of the associated device running the job processing application.

These and other aspects and advantages of the present invention will become apparent upon analysis of the following detailed descriptions and studying the various figures and drawings.

BRIEF DESCRIPTION OF THE DRAWINGS

FIG. 4B illustrates, according to one aspect of the present invention, further details regarding the IOPC element as incorporated with the ILIAD element of FIG. 4a.

FIG. 13 illustrates example header contents from a prior art unwashed EPS file.

FIG. 14 illustrates, according to one aspect of the present invention, example header and footer contents of a washed EPS file.

Appendix A illustrates, according to one aspect of the present invention, a table showing a portion of the Adobe Distiller API API with representative parameters that can be customized for print and preview graphics.

Appendix B illustrates, according to one aspect of the present invention, a table showing a portion of the Adobe PDF Library API with representative parameters that can be customized for print and preview graphics.

DETAILED DESCRIPTION OF THE PREFERRED EMBODIMENTS

An invention is described herein for improving the efficiency and consistency in generating a print job from customer data (i.e. textual, graphical, and line element information). In the following description, numerous specific details are set forth in order to provide a thorough understanding of the present invention. It will be apparent, however, to one skilled in the art, that the present invention may be practiced without some or all of these specific details. In other instances, well known structures, software, devices, and/or process steps have not been described in detail, so as to not unnecessarily obscure the present invention.

For ease of discussion, the following detailed description is made with reference to the generation and printing of a business card. It should be kept in mind that the inventive concepts disclosed herein apply equally well to many other types of materials such as film, screens, overlays, cloth, and printed matter such as letterhead, envelopes, notepads, posters, newsletters, coffee mugs, pens, hats, shirts, etc., and electronic materials such as vcards, web pages, email, etc. In accordance with one aspect of the present invention the Adobe PostScript language is used.

However, any other functional equivalent might be used for image generation according to a set of programming language instructions. Similarly, where other product examples are referred to, or used to achieve an end result, the same functional equivalent might also be used within the spirit and scope of the present invention.

The system of the present invention includes two main pieces: the Print Ready File format, which stores the PostScript data according to the present invention, and the related PostScript applications, which read and process the data in the file format according to the present invention. In addition, an Internet-based ordering system provides the customer with the ability to interact with the system to preview and approve orders. The figures below will provide an overview of the ordering system in order to demonstrate the context in which customers make use of the system. The detailed description will further provide a detailed description of the Print Ready File format and how it works with the related PostScript applications. It should be noted that the present invention would also work with other ordering techniques. The Internet-based ordering system described below is one example of how the invention may be used.

TRADITIONAL PRINT PROCESS

Figure 1:
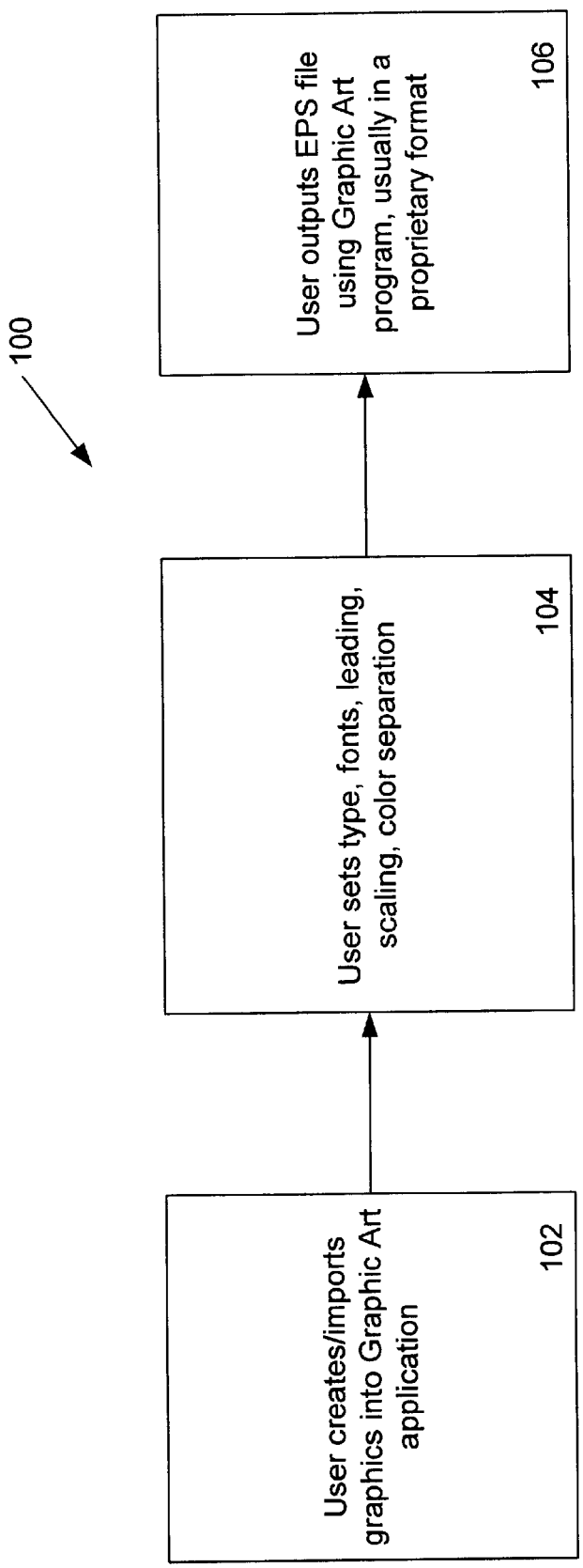
FIG. 1 illustrates a representative prior art block diagram of certain steps performed by a human operator in forming an EPS file.
Figure 2:
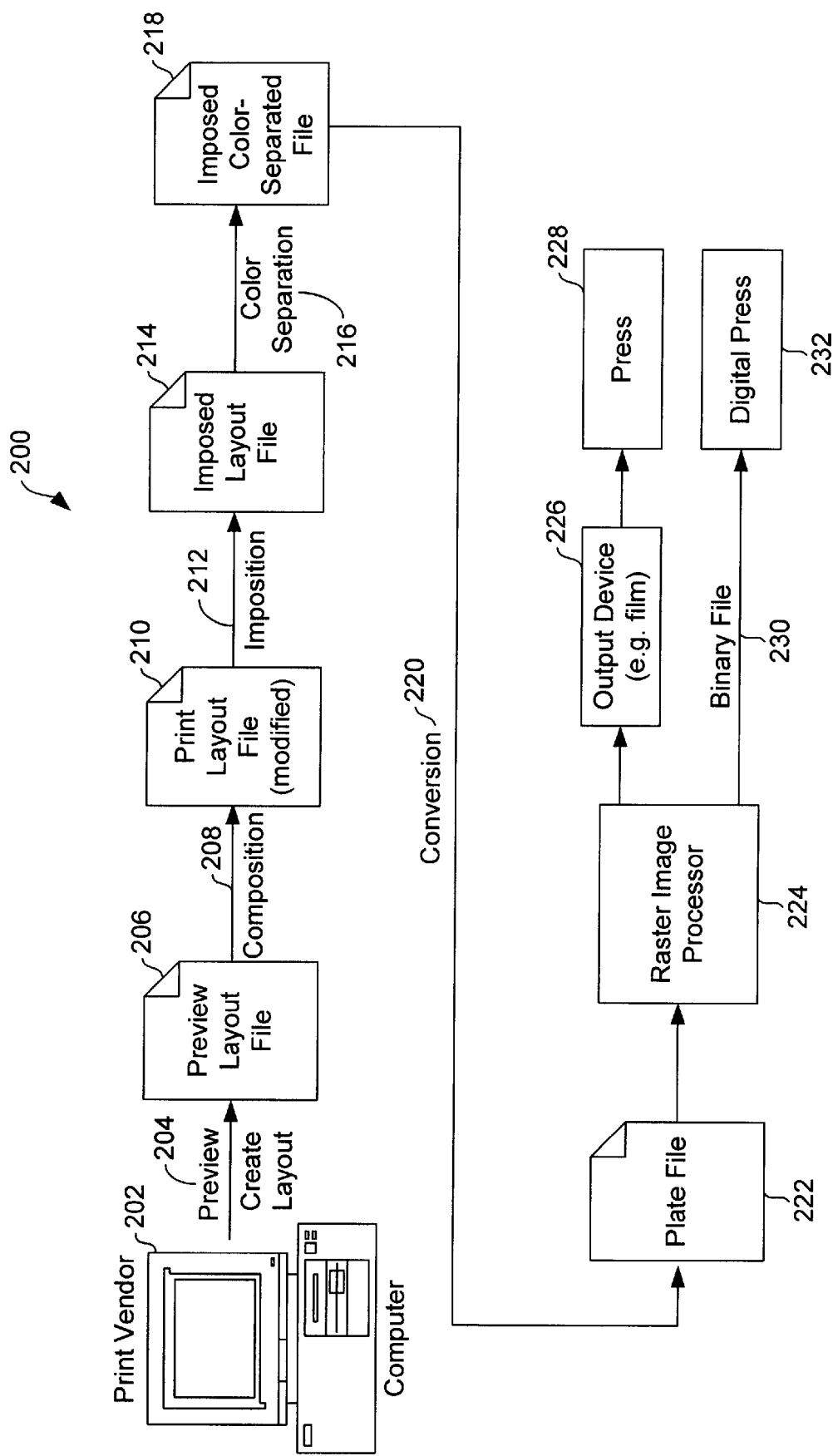
FIG. 2 illustrates a representative prior art block diagram of certain steps found in the traditional creation of printable material by a print vendor.

The propensity for errors, and the general lack of consistency produced using a traditional print process, is due, in large part, to the manual nature of the task (for instance, the pre-process step is very manual). At each step in the process, the file may be opened and manipulated repeatedly, which introduces new opportunities for errors and inconsistencies. FIG. 2 illustrates a prior art block diagram 200 of representative steps in the process. The sections below, in association with FIG. 2, will describe certain stages in the traditional process and delineate potential problems.

PREVIEW

The process begins with a customer providing the print vendor with the information to be composed on the product. The customer will typically provide the information on an order form, make annotations to a physical sample, and/or communicate the data verbally. The print vendor's job is to create a layout of the print product for the customer to preview and approve. The print vendor will typically interpret the customer's information and compose a preview layout of the product in a publishing tool such as Pagemaker or Quark XPress. In FIG. 2, this is shown by the print vendor computer 202 creating a preview layout 204, which results in a preview layout file 206.

Unfortunately, this task is made more complicated by a common practice called "mastering". To control costs in printing, it is common to pre-print or "master" stock in bulk with certain static elements. In many cases the static elements are "spot color" or "process color" graphics (while the variable information is usually in a single color, often black). In order to provide a preview of what the printed product will actually look like, the preview layout must contain both the variable information and the mastered elements. Once the preview layout is completed, it is then printed and faxed to the customer for their approval.

The customer then reviews the faxed proof, annotates any changes, faxes the proof back to the vendor and/or communicates the changes to the vendor verbally. Once the customer approves the preview layout, the vendor begins the Prepress process. It is important to note that the "preview" that the customer is approving is a faxed copy of a low-quality print out. Because the quality is so low, it is possible (even under the best of conditions) that the final printed product may look slightly different from the proof that the customer approved. If the customer is very demanding or detail-oriented, these differences may not be acceptable and will require that the vendor re-print the order.

COMPOSITION

Step 208 in FIG. 2 shows the next process step of composition. In particular, now that the customer has approved the item, the vendor must create a layout that is suitable for printing. To do this, all of the mastered elements that were included in the preview layout must be removed. This means that the vendor must open the preview layout file and manipulate the file data manually (or "by hand"). This is problematic, however, because the vendor is changing a file (or data structure) that the customer has already approved. It is possible that alterations will be made, either intentionally or accidentally, that will change the content or appearance of the product when it is finally printed. Step 210 shows the print layout file, as so modified.

The errors that can occur are numerous and varied. Even simple procedures can result in major problems. One simple example, for the purposes of demonstration, is the use of "keyboard shortcuts". Many professionals use a series of keyboard shortcuts (as offered by various programs) instead of a mouse (or other pointing device) to save time in performing simple tasks. These shortcuts typically require the user to press a modifier key (such as "ALT" or "CTRL") and then press the desired shortcut key. Sometimes, however, the user will mistype and accidentally end up inserting text into a document inadvertently. For example, if the user is trying to cut a graphic or piece of text from a document, the user might use the keyboard shortcut for "Cut" (which might be CRTL-X). If the user fails to fully depress the CTRL key, the letter "x" may be inserted into the document. While this a relatively straightforward problem, such mistakes might not be detected until late in the process. This might require the vendor to re-print the product, which is expensive and time-consuming. Hence, any reduction in the overall risk of introducing human intervention into the process would be advantageous.

Still other common problems involve maintaining consistency in at least the following: object spacing, lines, margins, color adjustment and selection, font spacing, justifications, kerning, and leading. The goal, as yet unattained by prior devices or methods, is to ensure the integrity of text, line and graphic elements in both print and preview operations.

As another representative example, the act of opening the file can lead to the common problem of "font substitution." Note that the preview layout file does not (generally) contain the font data necessary to display the text. To save space, the file simply refers to a font file that is stored on the computer used to open the document. If the computer does not have one or more of the fonts referred to by the preview layout file, the closest possible match will generally be substituted from the fonts available. This is known as "font substitution." Publishing programs may not inform the user that font substitution is taking place, which means that if the user does not notice the swap, then the substituted fonts will be saved with the new document.

When the vendor finally exports the data as a PostScript file for printing, the file will refer to the substituted fonts, not the original fonts. Sometimes the substituted fonts are very similar to the correct fonts, so they might look fine. However, in most cases the substituted fonts are significantly different, and this can cause the final printed product to look vastly different from the preview. Typical problems range from low impact results (e.g. the text looking slightly different), to severe differences (e.g. the text wrapping onto multiple lines, the text coming out completely garbled, etc.). Because final proofing will not be done until later in the process, these problems are often very costly to fix when (and if) they are eventually found.

IMPOSITION

Step 212 next shows the imposition being performed on the print layout file 210. Imposition is the process of preparing the "print layout" for production on a press. The main goal of imposition is to arrange multiple pages and/or images in the proper order for efficient printing. For example, it is far more efficient to impose four or more business cards onto a single plate than to print each business card individually. The imposition process also requires the addition of elements such as crop marks, registration marks, fold marks, color bars, die marks, and the like to the original print layout file. Imposition can be performed manually or via an automated program.

MANUAL IMPOSITION

Manual imposition is often performed on a different computer than that used to produce the preview layout. In many cases this step is even performed by a different person, introducing more opportunities for errors. To impose a plate, the vendor must open the original print layout file and add one or more additional print layouts to create an Imposed Layout File, shown as 214. (It is important to note that some customers like to approve the final imposed layout. As a result, some vendors perform imposition during the preview stage.) Because the imposition process is manual, the errors common to the composition stage can also occur during imposition. Another problem is that because the traditional process for print production is so time-consuming, the information that is to appear on an order may change during the process. In many cases, additional last-minute orders can be added by the customer at any stage in the process, requiring the vendor to go back and make changes to the imposed layout.

AUTOMATED IMPOSITION

Some vendors use software products such as Preps by ScenicSoft to build the imposed layout file. Although automated imposition is less susceptible to human error, the process is less than foolproof. For example, it is common for the automated imposition tool to run on a different computer than the original system used to produce the preview layout. This means that the layout file, when exposed to the automated imposition process is subject to, for instance, font substitution errors, graphic substitution errors, and the like.

COLOR SEPARATION

Color separation, as shown in step 216, is the process of separating a color image into a series of single color images that will be used to produce plates. When each single-color plate is printed on top of one another, the result is a composite color image. The color separation step produces an imposed color separated file 218.

In many cases color separation is performed by a RIP (Raster Image Processor). Sometimes, however, the imposed layout file must be color separated prior to the RIP, which means that the vendor must use another software program. In such cases, font and graphic substitution errors can occur just as they did in the composition and imposition stages.

PRINTING

Once an imposed color separated file is produced it is converted 220 to PostScript, or a plate file 222, for processing by a RIP 224. There are many techniques used to create PostScript files. Depending on the workflow employed by the print vendor, the PostScript file may include font subsetting as well as OPI (Open Prepress Interface) comments (or executable segments of code) that are processed by the RIP device. In either of these cases, it is possible to introduce font and graphic substitution errors. The output from the RIP (which is generally a bitmap file) is sent to an output device 226, which might include a Recorder or Image Setter. The output device 226 places the image on a medium to be used by the press device 228. Such media might include film or digiplate, with direct to plate referring to a media process for taking the image and putting it on a media. Alternatively, the digital or binary file 230 could be received directly by a digital press device 232 for printing.

SETUP PROCESSES

Figure 2A:
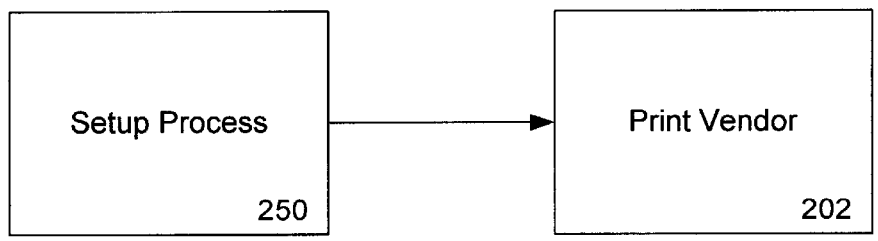
FIG. 2A illustrates, according to one aspect of the present invention, the setup process (for washing or otherwise) being performed before the Print Vendor of FIG. 2.
Figure 2B:
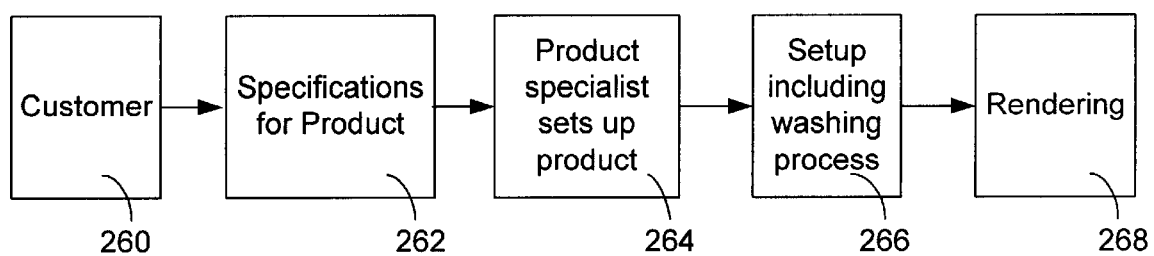
FIG. 2B illustrates, according to one aspect of the present invention, a representative series of steps that incorporates the washing process.
Figure 2C:
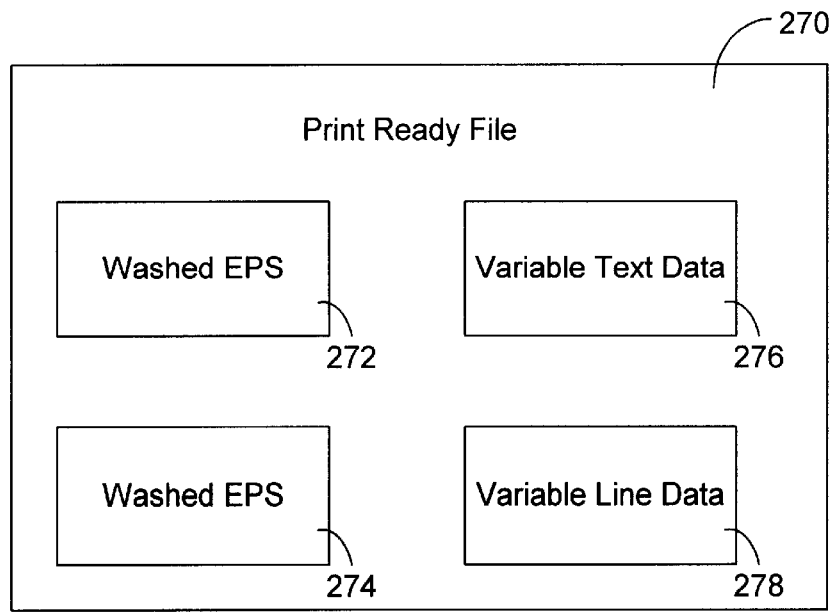
FIG. 2C illustrates, according to one aspect of the present invention, a representative Print Ready File having washed EPS files.

Prior to the Print Vendor process, certain Prepress operations can be performed on the graphical (or other types) of files. These Prepress operations can be performed by the Farm service, (or one of the service hosting machines comprising a multi-server Farm). As shown in FIG. 2A, the setup process 250 is performed before the Print Vendor element 202 of FIG. 2. FIG. 2B shows a series of representative steps that might comprise the setup process. A customer 260 supplies specifications for a product 262. The customer might interact with a product specialist, who aids the customer in setting up the product, as shown in step 264. Graphical files provided by the customer will be washed according to the present invention in step 266. Any resulting files can thereafter be rendered in step 268. Referring now to FIG. 2C, an example Print Ready File 270 is shown, which might result from certain processes described in-part herein, and more fully described in the incorporated references. A Print Ready File is comprised of line, text, and graphical elements. The text and line elements might be variable, or static. The resulting Print Ready File is a representative example, and is shown to include a first washed EPS file 272 as a graphical element, a second washed EPS file 274 as a graphical element, a variable text data element 276, and a variable line data element 278. The washed EPS files resulted from the Prepress washing operation, and where later included in the consistent PostScript PRF 270.

The Print Ready File System described below is covered more fully in the incorporated references. Certain descriptions pertaining to FIGS. 3, 4, and 4A–4C are repeated below to facilitate description of the load balancing, and washing process of the present invention.

PRINT READY FILE SYSTEM

Figure 3:
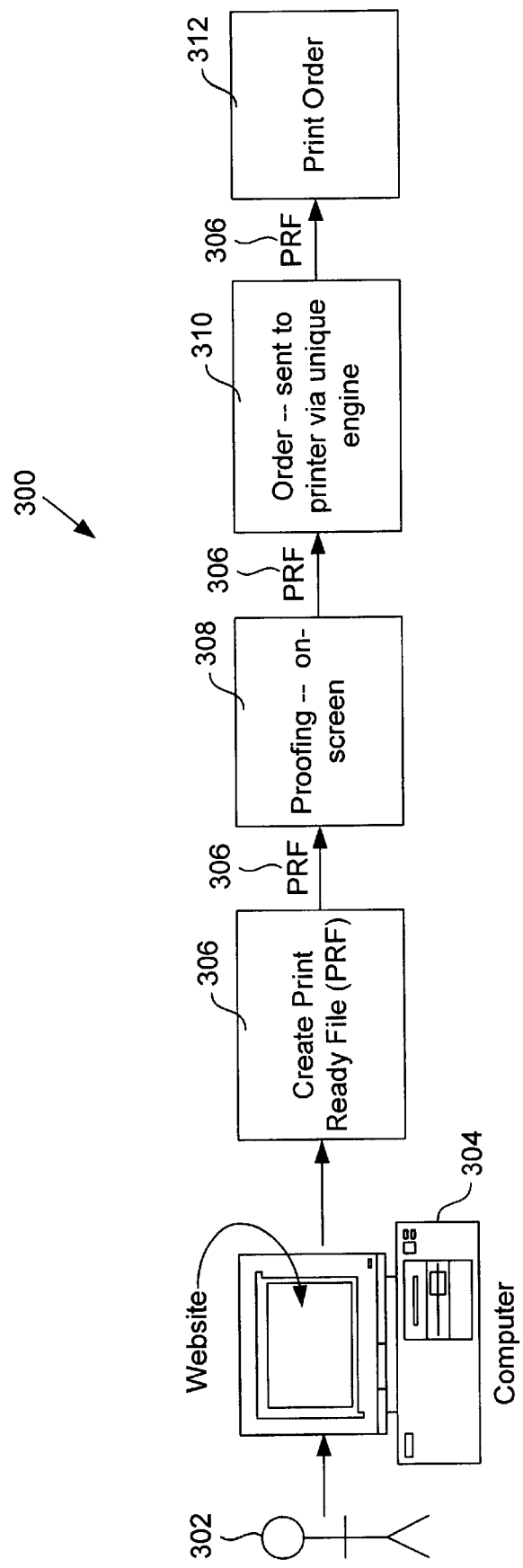
FIG. 3 illustrates, according to one aspect of the present invention, a generalized series of steps used in creating a print order.

FIG. 3 shows a block diagram 300 a generalized series of steps used in creating a print order. A customer 302 contacts a website via the computer 304. The customer inputs data on the website according to data prompts needed to generate the customer's desired print job. The system of the present invention creates a Print Ready File (PRF), as shown in element 306. The PRF 306 is shown to the customer 302 for on-screen proofing 308 of various elements comprising the product. Once the order is approved, step 310 shows the order being sent to the printer via the engine of the present invention (described in further detail below). The PRF 306 is thereafter sent to printer as a print order 312, and the manufacturing (or printing) process begins. The steps of the present invention provide an elapsed time to order of approximately 10 minutes, or less.

As an overview to an Internet-based ordering system, a "setup phase" is used wherein the Print Ready File system is configured to produce a Print Ready File for each of the products that the customer wishes to order. In addition, the Print Ready File system also configures an Internet front-end to provide a custom web site for that customer. The customer goes to a web site and selects a particular product to order. The web site loads a pre-configured order form for the selected product, and the customer enters the data they wish to appear on the card. The web site then transmits the data to the Print Ready File system, which generates the Print Ready File (e.g. as a unique PostScript file).

The web site takes this Print Ready File and uses it to create the preview layout. It does this by sending the Print Ready File to a viewer program (i.e. the Adobe Acrobat Distiller program), which reads the Print Ready File and creates a Portable Document Format (PDF) file. This file is then sent to the customer via the Internet and is viewed on the computer screen of the customer. In the preferred embodiment, the preview is displayed as a PDF file. While other types of files might be used (GIF, etc.) PDF files are preferred because first, they are extremely high in resolution quality, and second, a PDF file provides a customer with a well-known format to process and view the preview layout.

The customer then views the file and determines approval (or not) of the item. If the customer desires to change their individual data, the customer then views the order form again, changes their data, and the system generates a new preview file. If the item is approved, the customer clicks a button that tells the system to save the order. The order data for the customer (i.e. quantity, shipping address, etc.) is saved to a back-end database, and the Print Ready File is saved on a server. Once the order is saved, it may be tagged as a "pending" order or a "released" order. (Some customers wish for all of their orders to be stored in a holding queue so that an administrator may grant them final approval. These are considered "pending" orders. Once the administrator grants final approval, the "pending" order is marked as a "released" order.)

Once an order has been released, it goes through the various stages of the production process (e.g. setup, composition, imposition, etc.) which are described in further detail below. Each stage of the process uses the Print Ready File that was generated when the user created their preview. This file remains unaltered all the way through the printing process. Once the order is printed, it is shipped to the customer, and the order is complete.

Figure 4:
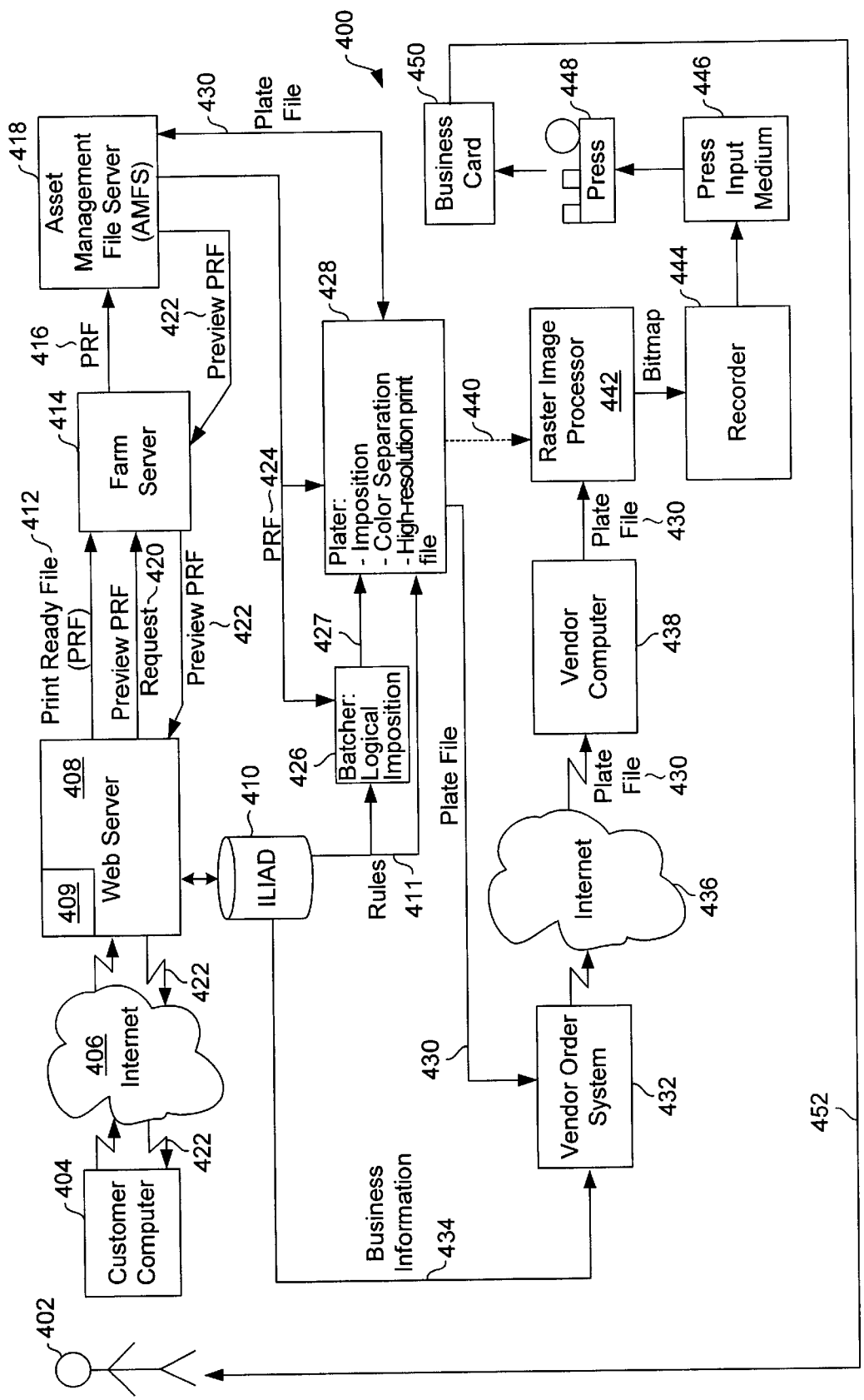
FIG. 4 illustrates, according to one aspect of the present invention, a block diagram of the overall ImageX.com automated system, as described more fully in the incorporated references.

Referring now to FIG. 4, further system-level details of this overall process are shown. A block diagram 400 is shown of the Print Ready File system and the interaction of representative components. In general, this Figure describes an overview of an Internet-based ordering system (as stated above, other ordering modes might be used). The customer 402 is shown interacting with a customer computer 404. A website residing on the primary webserver 408 is contacted via the Internet link 406. An Image Logic Information Database (ILIAD) 410 is coupled to the server 408.

Figure 4A:
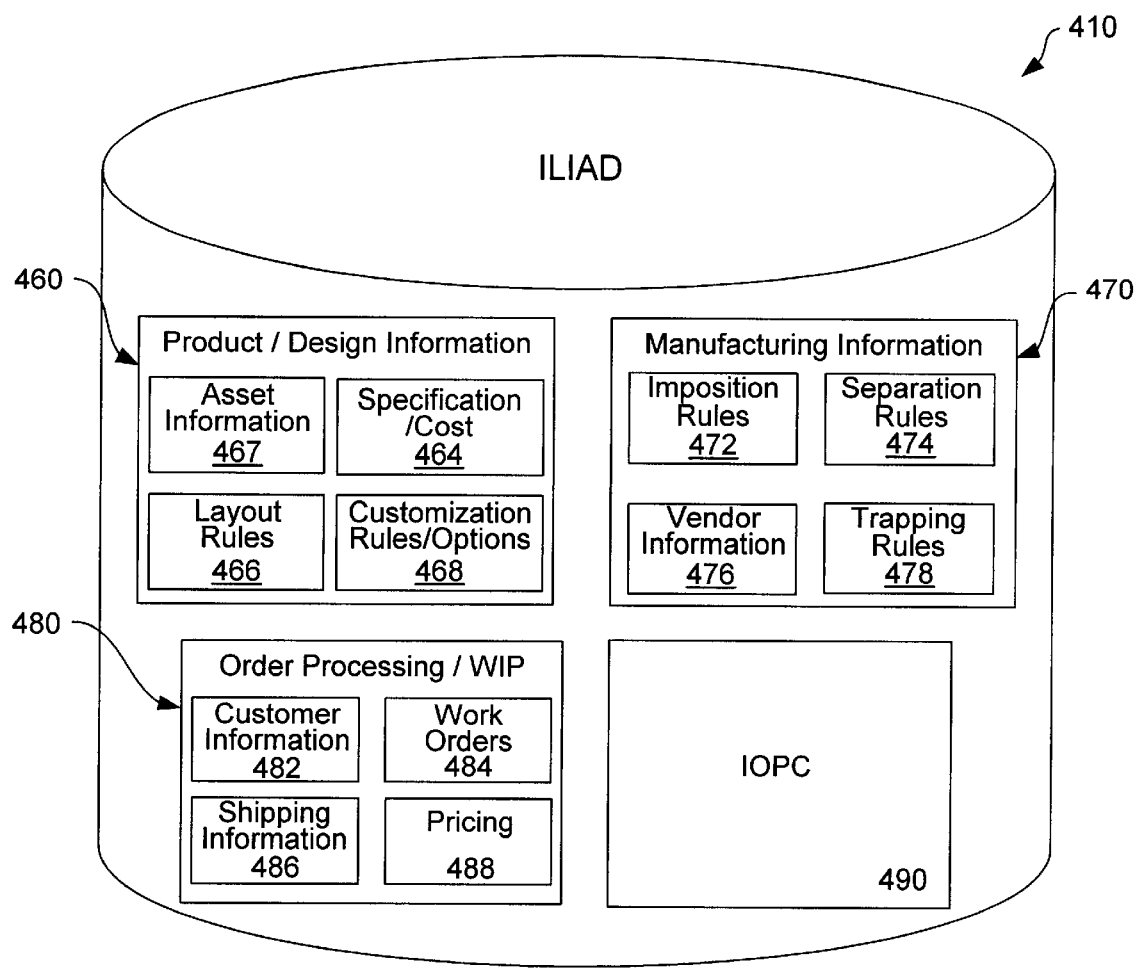
FIG. 4A illustrates, according to one aspect of the present invention, further details regarding the ILIAD element of FIG. 4.

The general data composition of ILIAD 410 is further described in FIG. 4a. The elements shown are meant to be illustrative, and are not meant to limit the data structure of ILIAD to such elements. Product and design information are shown generally as element 460, and is shown to further include asset information 462. Asset information is intended to include various customer logos, text, or fonts (i.e. "assets" of the customer) to be used on the printed products. Such information might be provided as data files, or via menu prompts and the like, from the customer. Specifications and costs 464 would include information pertaining to individualized costs for implementation of certain designs, and the like. Layout rules 466 would include the various rules to be used in arranging figures or text on the printed product, so that conflicts and inappropriate layout schemes do not occur. Customization rules and options 468 might provide for further custom design capabilities in arranging unique layouts.

ILIAD 410 is also shown to include manufacturing information 470. Such manufacturer information might include (but is not limited to) imposition rules 472, separation rules 474, vendor information 476, and trapping rules 478. These various rules are used in the production engine for arranging and preparing the images and/or elements in the Print Ready File (PRF). Order processing and work-in-progress (WIP) information 480 is also shown. Such information might include (but is not limited to) customer information 482, work orders 484, shipping information 486, and pricing information 488. An IOPC (ImageX Online Printing Center) database 490, or similar Online Printing Center module, is shown incorporated with ILIAD, with further details regarding its data contents described in FIG. 4b. The IOPC database might also exist separately from the ILIAD, but is shown incorporated here as one embodiment.

Figure 4B:
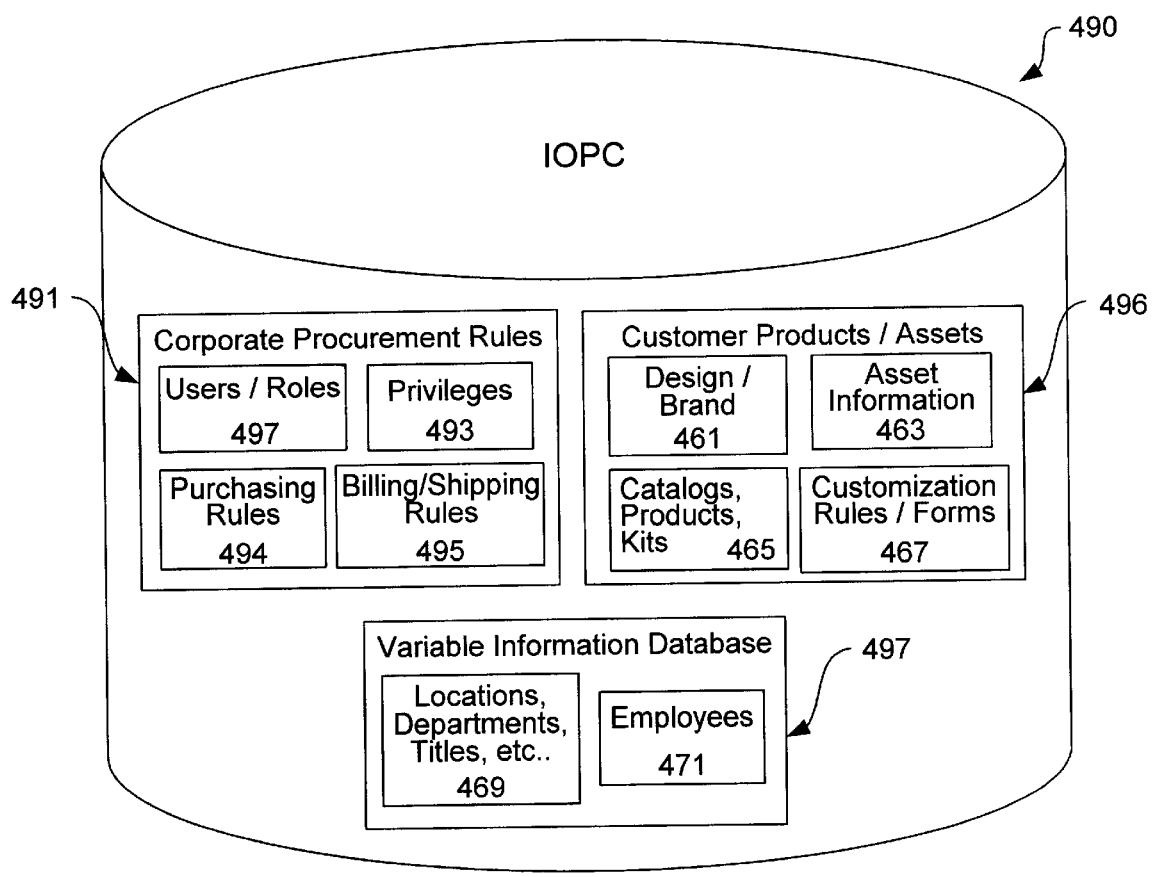

Referring now to FIG. 4b, the IOPC 490 is shown to include (but is not limited to) corporate procurement rules 491. Such rules might further include users/roles 492, privileges 493, purchasing rules 494, and billing/shipping rules 495. Customer Products/Assets 496 are shown further comprising IOPC 490. This data grouping 496 might include design/brand information 461, asset information 463, catalogs-productskits 465, and customization rules/forms 467. The IOPC 490 is shown to further include a variable information database 497. This data store contains information that regularly changes, such as locations, departments, titles, etc. 469. Employees 471 are also included in this data grouping 497.

Referring again to FIG. 4, the PRF 412 is next sent to the Farm 414 (or "the Farm"). The Farm 414 is generally comprised of at least one, and usually several, high powered computers (e.g. a PCs running Windows NT). The farm is designed to load balance file processing tasks by determining system impact of various jobs and distributing them accordingly. The Farm is also highly scalable, with control being routed through a single point of contact (i.e. a server, which might be referred to as a "Master Farmer"). Each different file processing module (or "Farm Plot") runs out of process from The Farm main process. Within the Farm, each Plot is controlled by a "Field" which is specific to the plot. The Field communicates with the Plot and handles all the specific interactions with the Plot. Jobs can be re-routed if failures occur within any particular Farm, Field, or Plot. Time estimates can also be provided regarding the processing of jobs. The Farm, in general, introduces little overhead in processing of tasks, and each different Farm service can be configured to run any of the file processing tasks. The Farm 414 provides a platform apart from the webserver 408 for running processing steps on the PRF. It should be noted that any such processing could also be done on the webserver 408.

Figure 4C:
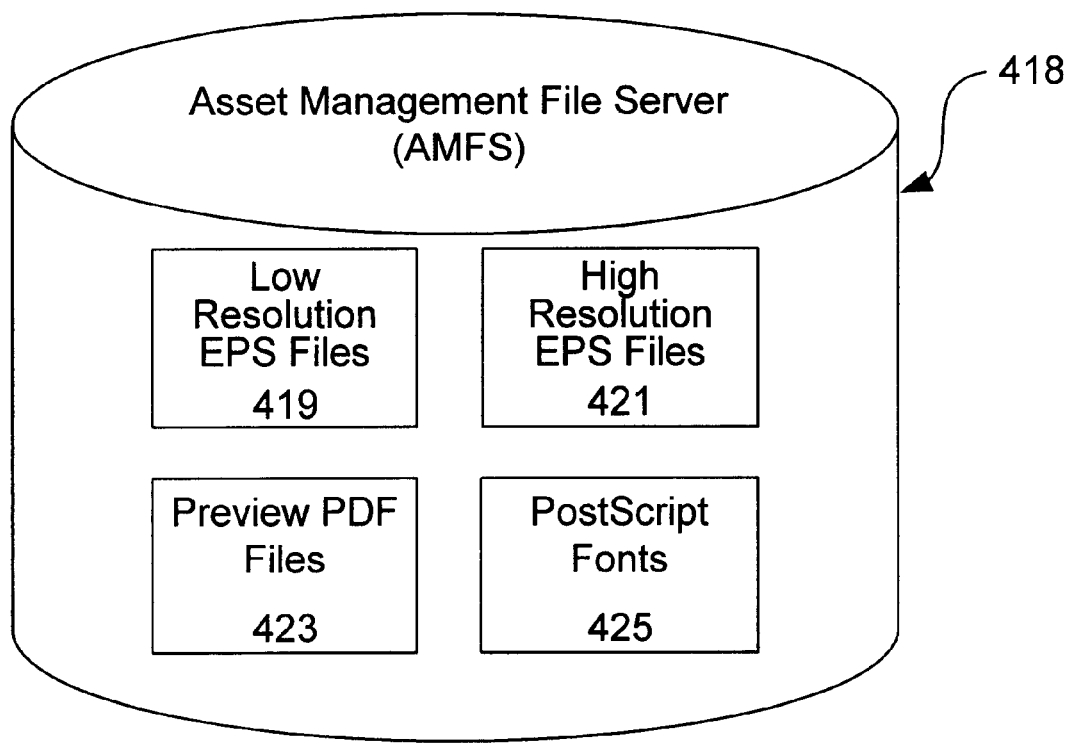
FIG. 4C illustrates, according to one aspect of the present invention, further details regarding the Asset Management File Server of FIG. 4.

The completed PRF 416 is thereafter passed onto the Asset Management File Server (AMFS) 418. The general data composition of the AMFS is further described in FIG. 4c. The AMFS 418 is file server (or database or the like) used to store components relating to a client's product which should generally not change. In other words, these are the "Assets" of the client, such as company logos and the like. Such components are intended to include (for example) Encapsulated PostScript (EPS) files containing customer logos and graphics. Further included are diagrams, illustrations, static text and the like. Referring now to FIG. 4c, the AMFS 418 is shown to contain representative data, including for example low resolution EPS files 419, high resolution EPS files 421, Preview PDF files 423, and PostScript Fonts 425.

Referring again to FIG. 4, the user can also request a preview of the PRF 420. The Farm 414 reads back the preview PRF 422 from the AMFS 418 data store. The preview PRF 422 is then sent back to the web server 408 which applies software such as the Adobe Acrobat Distiller program. This (or similar) software reads the PRF and creates a PDF or similar file. The preview PRF file 422 is then sent to the user via the Internet and is viewed on the customer's computer screen.

If the preview PRF is accepted by the user, the finalized PRF 424 is thereafter retrieved from the AMFS 418 and sent for further processing operations. A batcher 426 and plater 428 are shown which are each typically comprised of a PC or the like. The batcher 426 receives the PRF 424 and performs logical imposition on the data. This would include server based software for automatic imposition. The plater 428 performs further steps including, for instance, imposition and color separation, and the formation of a high resolution print file. Both the batcher 426 and the plater 428 communicate via link 411 with the ILIAD 410 in order to read and use the rules stored therein in performing their designated tasks. The batcher 426 and plater 428 also communicate via link 427, which might include an TCP/IP link or the like.

A plate file 430 is thereafter stored in the AMFS 418. The plate file 430 is also sent to a vendor order system (VOS) 432. The VOS 432 is typically comprised of a PC or the like. The VOS 432 serves as a transactional machine, or a gate for all other vendors which might exist downstream. The VOS 432 might process tasks or information, including but not limited to, job instructions, purchase orders, invoices, payments, and shipping status of orders. The VOS 432 includes a link 434 to the ILIAD in order to retrieve various business information pertaining to particular customers. The VOS 432 receives a plate file 430 from the plater 428. In this example, the plate file 430 is yet another type of PostScript file (whereas other types might be used).

Thereafter, the elements and steps which are shown are illustrative of what might occur after the VOS 432. The VOS 432 might be used to send the consistent plate file to any other system or request source via any reasonable medium. Such information could be (for example) traded, auctioned off, or distributed across many different markets, in many different ways, and across many different mediums. It could be supplied by various customers and aggregated for processing by VOS and ILIAD. In this example, an Internet connection 436 is shown wherein a vendor computer 438 interacts with the VOS 432. The vendor computer 438 negotiates an order with the VOS 432 and receives the plate file 430. Many other such vendor computers might exist and contact the VOS 432. Vendor computer 438 thereafter sends the plate file 430 to a Raster Image Processor (RIP) 442. Note that the plate file might alternatively be sent directly to the RIP via link 440 if the VOS 432 is not a desired element in the process. The RIP 442 is typically a PC or the like running RIP software. The RIP produces a bitmap file 443 which is sent to a Recorder 444. The recorder 444 is an image setting device which takes the raw bits from the RIP and translates them into a press input medium 446. Such media 446 might include film, RC paper, or whatever input source the press 448 is looking for. The press 448 takes the input medium source and produces the end result, in this case a business card 450. The business card 450 is shipped or routed 452 back to the customer 402 to complete the overall process.

The overall process 400 described in FIG. 4 makes use of an inventive Print Ready File that provides many advantages, including but not limited to the following: (1) The file preferably maintains its state, even if the elements that comprise the file are altered in the creating application. For example, high resolution files can be logically embedded for access and processing at an appropriate point in the Prepress process described herein. (2) The file contains both elements that the customer wants to see in a preview, and elements that a print vendor needs to see for a printing, each one being potentially mutually exclusive. (3) The file can be fed, or converted and fed, into imposition software, and color separation software. (4) The file can be fed, or converted and fed, into software to generate a PDF file or bitmapped image for a preview. (5) The file can create basic elements (e.g. ten, and small in file size) in a relatively small amount of time (e.g. under a second) on a desktop hardware platform. (6) The file supports three representative element types: text, line, and embedded graphic (raster or vector). (7) The file preserves the integrity of embedded graphics which originate from customers using standard graphics programs such as FreeHand, Quark, Illustrator, PhotoShop and Page-Maker. (8) The file maintains the integrity of text, line, and graphic elements in both print and preview. This integrity can be demonstrated in the way of fonts, kerning, leading, line widths, and graphical reproduction. One possible exception is that raster images may be downsampled when converting to a preview file type.

The output to the print vendor should preferably be in Level 1 PostScript, to support all possible RIPs. To accommodate these features, the preferred embodiment implements the Print Ready File in the Adobe PostScript language. It should be noted that other languages aside from PostScript can also be used that support the above conditions. For example, other page composition languages/formats can be used. Also, other RIPs or specialized equipment can be supported for custom print orders, and the like.

MASTER FARMER, FARM SERVICES, AND LOAD BALANCING

Figure 5A:
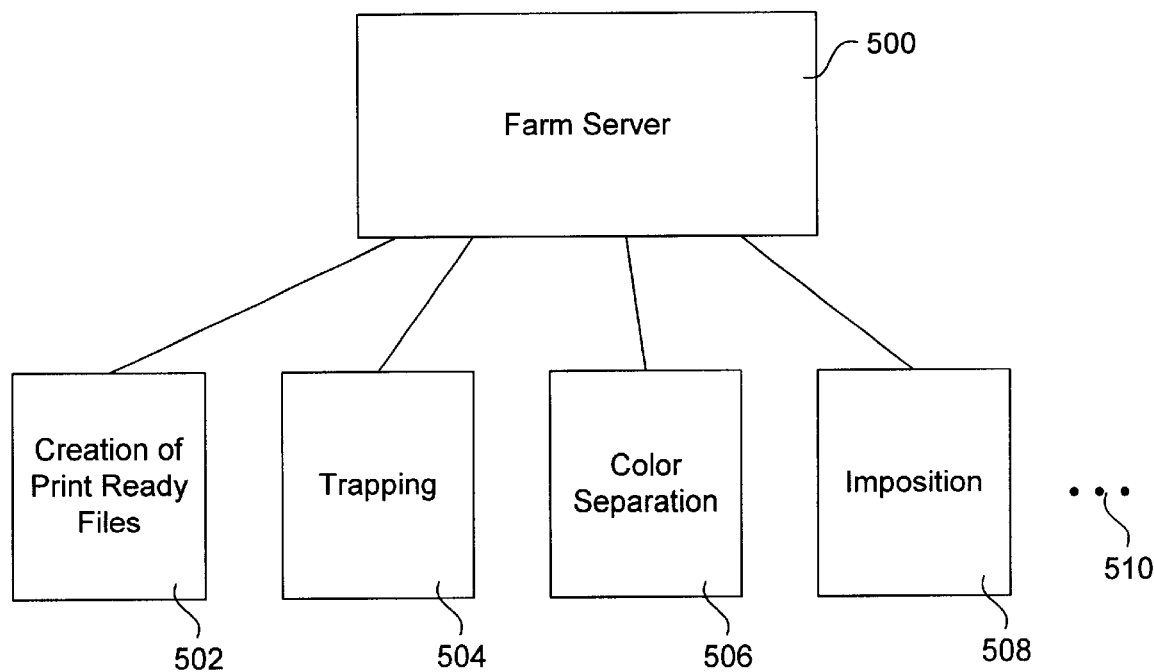
FIG. 5A illustrates, according to one aspect of the present invention, the Farm Service of FIG. 4, which hosts a variety of Prepress operations.

In relation to the above described system for generating a PRF, the present invention provides for running any of a variety of operations on the Farm Service, or associated services. In particular, Prepress operations can be performed. Referring to FIG. 5A, a representative Farm service 500 is shown running the operations of: creation of Print Ready Files 502, Trapping 504, Color Separation 506, and Imposition 508 (all in relation to formation of the PRF). As indicated by the continuation symbol 510, other operations might also be performed.

Figure 5B:
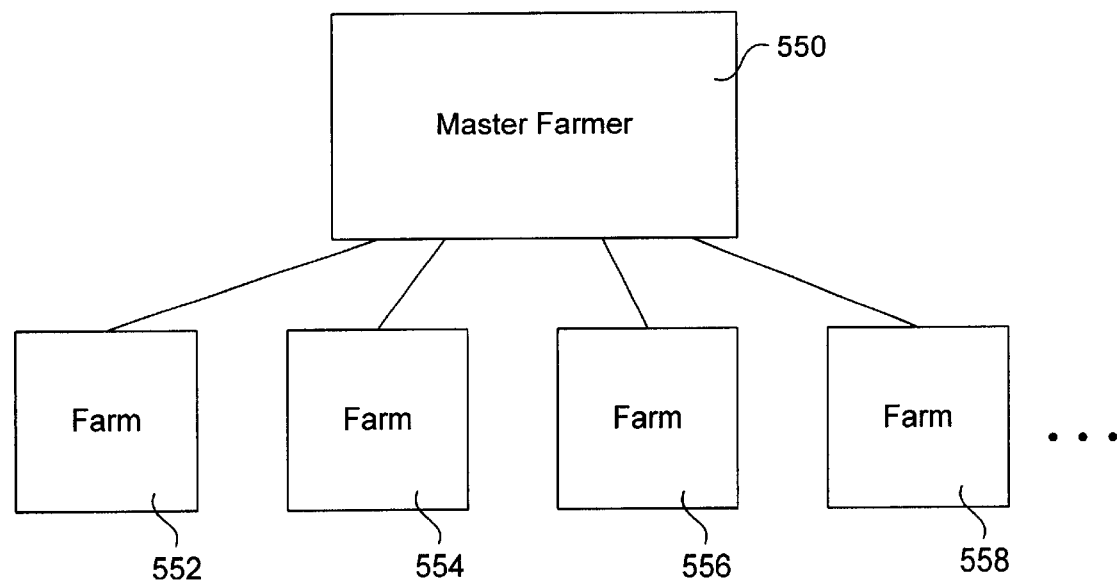
FIG. 5B illustrates, according to one aspect of the present, a Master Farmer over many Farm services.

Referring now to FIG. 5B, a Master Farmer 550 is shown interacting with a plurality of Farm services 552, 554, 556, and 558. Still other Farm services might also be connected to the Master Farmer, as indicated by the continuation symbol 560. The collective interaction of the Master Farmer and the Farm Services will be referred to as the Farm.

Figure 6:
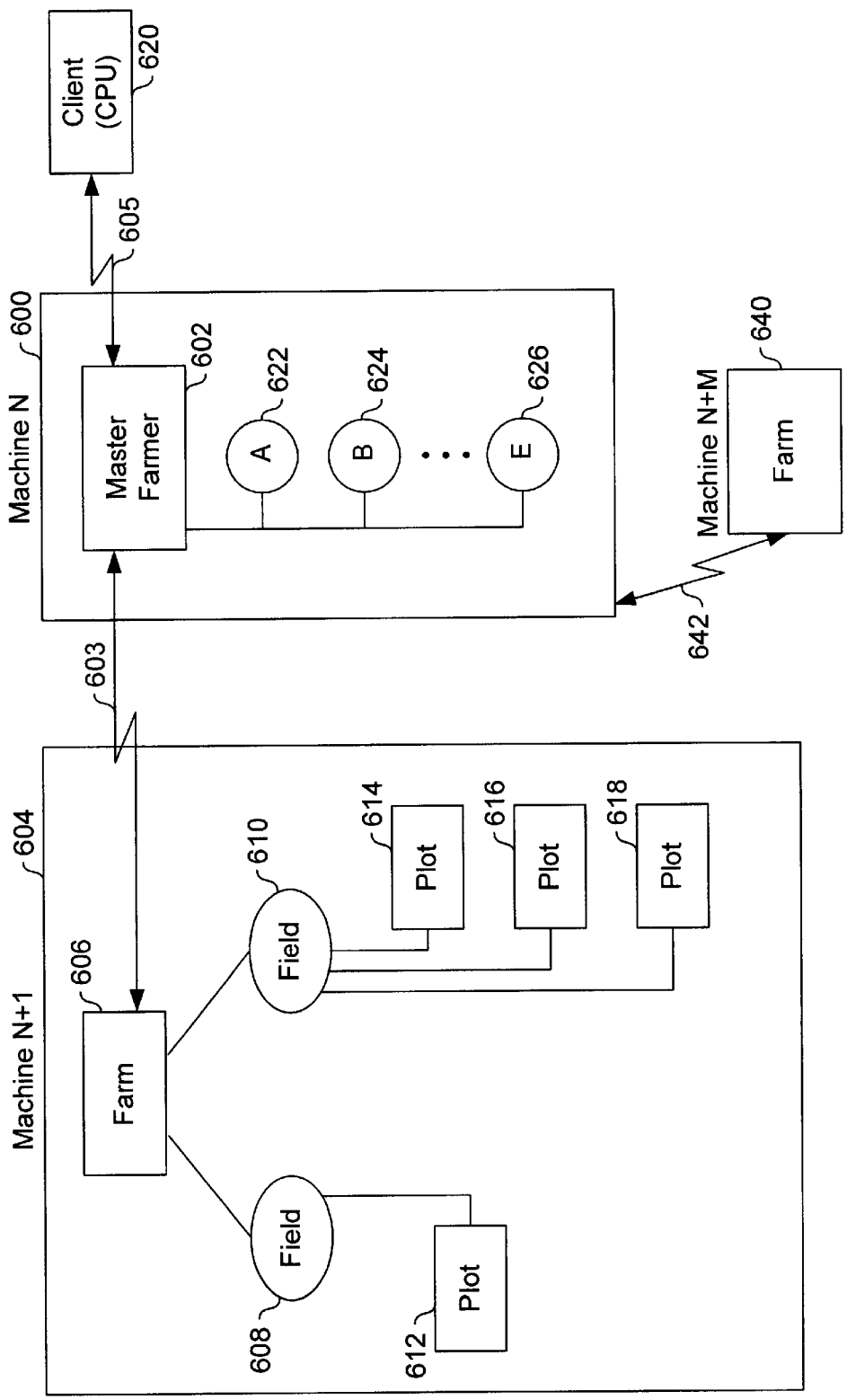
FIG. 6 illustrates, according to one aspect of the present invention, an example Master Farmer interacting with a Farmer Server, and a client.

FIG. 6 shows the interaction between the Master Farmer and Farm services in more detail. A first machine N (600) is shown hosting (or running) the Master Farmer 602. A second machine N+1 (604) is shown hosting (or running) the Farm 606. The Master Farmer 602 interacts with the Farm 606 via link 603. This link might be over any of a variety of transmission mediums, including the Internet. Still other machines, i.e. machine N+M (640), can be included to host other Farms, and interact with the Master Farmer via link 642.

According to the present terminology, the basic structure underneath a Farm service includes Fields, e.g. 608 and 610. The purpose of a Field is to communicate with a specific Plot (e.g. 612, 614, 616, and 618). A Plot is an application (or the like) that can be made to run out-of-process from the Farm. A Plot is generally a device that runs a secondary application with job data, in order to generate an output. The Plot is essentially the device responsible for making sure the task (or job) gets completed. The Plot is used to turn the job packet, which is also referred to as the Crop, into a format that a particular application can understand. It is generally the function of the Plot to monitor the job and encapsulate the time estimation for completing the job. When the Master Farmer passes a crop to the Farm, it is referred to as Sowing. When the Farm hands the ask off to the Field, it is can be referred to as "Planting."

This out-of-process structure of Plots is maintained so that if something were to go wrong with the Plot, it does not necessarily affect (in an adverse way) the running of the Farm system. Each Plot processes a file or task, and each Plot is tied to one application. The Field serves as a place for the Farm service to find out the status of the Plots. The Field is generally configured to run as part of the Farm service process. If the Field goes down, then the associated Farm service also goes down. Plots, however, generally need to run out-of-process since the system will have little control over third party applications. If a third party application ceases to work, then it will not take down the whole associated system.

A client 620 (as typically shown using a CPU) interacts with the Master Farmer 602 via link 605. The client provides tasks or jobs, such as files or the like, to be processed by the system. These tasks or jobs are represented as job A (622), job B (624), and so forth through job E (626). As each file or task request comes into the Master Farmer, it is thereafter distributed to a Farm, and then to a Field, and then to a Plot for handling that task. Typically a Plot is configured (or chosen) to handle one particular type of incoming task. The Plot processes the task, and sends back a message regarding the success or failure in performing the task.

An example Plot might include Adobe Acrobat Distiller, which converts a PostScript file into a PDF file. PDF (Portable Document Format) is a file format that has captured all the elements of a printed document as an electronic image that can be viewed, navigated, printed, or forwarded. PDF files are created using Adobe Acrobat, Acrobat Capture, or other comparable products. To view and use the files, the Acrobat Reader is typically used. PDF files are particularly useful for documents such as magazine articles, product brochures, or flyers, when it is desired to preserve the original graphical appearance of the pages. Still another example of a Plot application includes Viper, which is used to generate Consistent PostScript files. The overall system structure might include many such Plots, each of which are capable of running the same application such as Distiller, Viper (or others). Such redundancy allows for simultaneous processing of similar tasks or jobs.

Each separate Plot is configured to communicate with its associated Field, and the Farm will "oversee" (manage, monitor, etc.) the Fields underneath it. The system is designed to let any number of Fields run on a particular Farm. If it is determined that any particular Plot is too processor intensive, that particular Plot can be run on a single Farm service, and/or on a single Farm machine. This can be used to speed up the processing of Plot applications on other Farm machines. Moreover, the different elements of this system can be segregated and moved very readily from one machine to another. For instance, a Field (with all of its Plots) running on a particular machine can be moved onto a different machine. This can provide extra processing speed for Fields remaining on the original machine.

As a result, the Farm system is generally scalable, since the system is controlled by a single point of contact, namely the Master Farmer. The Master Farmer distributes work among the Farm services. Each machine in the Farm system has an instance of the Farm service running on it. Each Farm communicates with the Master Farmer, thereby making itself available for jobs. Each Farm can have one or all of the file processing tasks running on it. As many new machines as are needed can be added to run the Farm service, and thereby accommodate varying loads. Each Farm service can include configurable parameters to control its system usage (e.g. Windows NT threads, or the like). The service can also be tuned to particular tasks that the service performs, and to the machine that the service is running on. The Farm system can take advantage of multiple processors, and be made to scale upwards (or downwards) according to the system on which it is running.

As for errors, there are generally two types: job or task errors, and system failures. System failures are when a particular Farm service, Field, or Plot fails unexpectedly when trying to process a task. This failure would generally be in an area that should not be failure. In such a case, the Farm service will alert the Master Farmer that it will no longer accept tasks, and shut itself down. When a particular Farm has shut itself down, or stopped communicating, the Master Farmer will route all tasks running on that Farm to other Farm machines running that specific file processing task.

The Master Farmer therefore serves as a central load balancing area. The overall Farm (i.e. the combination of the Master Farmer and Farm services) is designed to load balance file processing tasks. To perform such balancing, the Farm determines how processor intensive each particular application is, and processes the file either locally or remotely. The Farm is configured to determine the system impact by the size of the job rather than the actual task being performed. Each different type of file processing task judges the relative size of each task and the Farm uses this size, and the current processor load, to determine how to distribute (or load balance) the various tasks.

If a client machine needs to process a job, then the client machine will interact directly with the Master Farmer. Example jobs might include: creating a consistent PostScript file, converting a PostScript file into a PDF file, or converting a PostScript file into a BitMap file. The Master Farmer has one or more Farm machines connected to it. The Master Farmer machine might also be configured to have a Farm process running on that same machine. The Master Farmer is constantly receiving updates from each Farm machine (or server), wherein the Farm machine provides feedback on the burden level of the Master Farmer. The burden level relates to how long a particular job will take on that Farm Service.

Figure 7A:
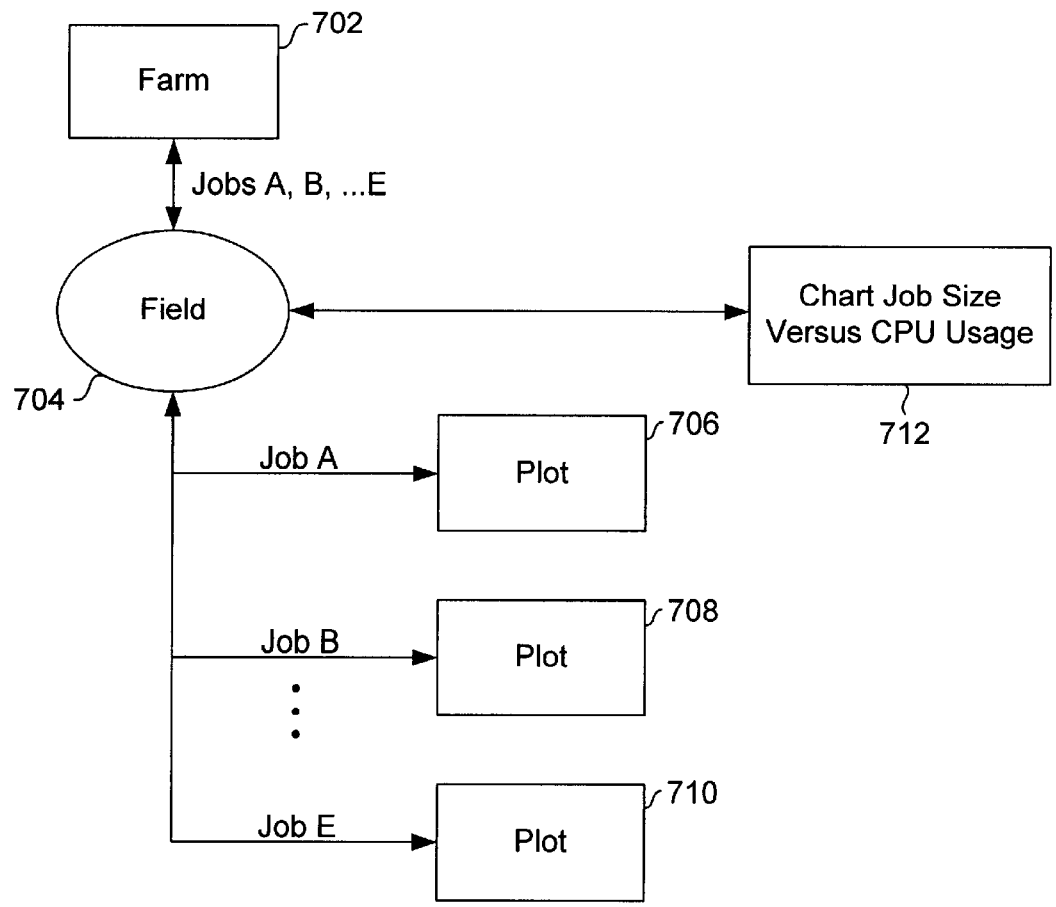
FIG. 7 illustrates, according to one aspect of the present invention, load balancing associated with the processing of jobs.

Referring now to FIG. 7A, yet another level of detail is shown regarding the relationship between the Farm services, Field, and Plots in terms of load balancing. Each Farm 702 receives jobs A, B, . . . E from the Master Farmer. The Farm sends the respective jobs to a Field, which has associated Plots 706, 708, and 710. The jobs are sent to the respective Plots according to the job type. For instance, if a client wants to convert a PostScript file into a PDF, the client sends that particular request to the Master Farmer. The Master Farmer then determines which particular Field has the necessary application (or Plot) associated with it to accomplish this task. The Master Farmer maintains an evolving list of the Farm services and associated Fields and Plots. The Master Farmer walks through each Farm service, and determines which potential Plots might be able to process the task.

Figure 7B:
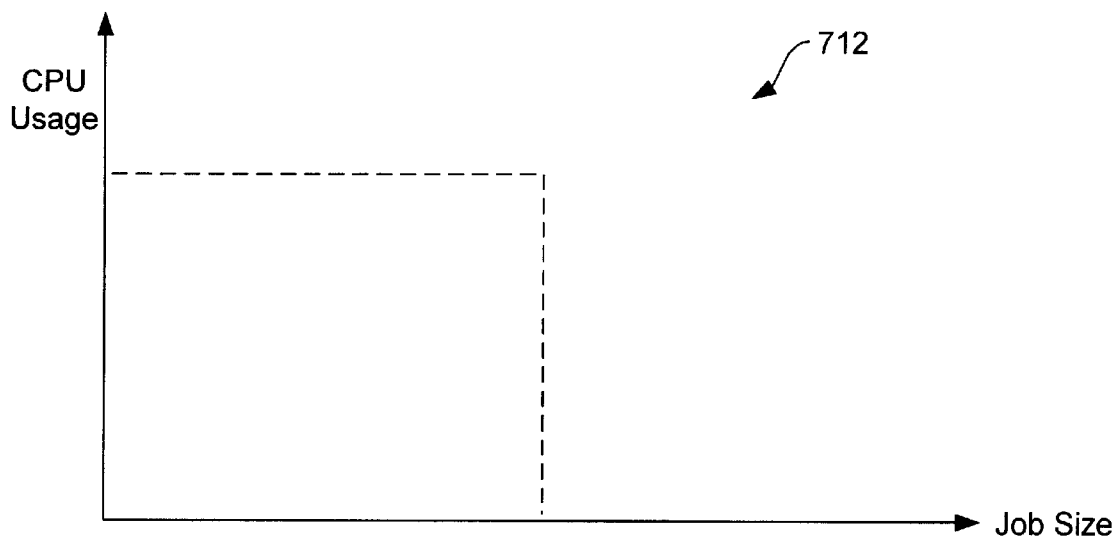

The Master Farmer also determines the level of burden for each Farm service. The level of burden is a function of the CPU usage for the machine associated with the Farm service, and the size of the jobs being processed by each set of Plots associated with a Field. Each task being sent to the Master Farmer has a size associated with it. This is a relative number that is used to estimate and load balance the task. Each Field maintains its own chart 712 of CPU usage versus job size, in order to provide an estimate of how long the particular job will take. FIG. 7B shows a representative example of such a chart 712 in more detail. The charts are compiled into an overall level of burden on the Farm service, and the Master Farmer decides which Farm service will receive any particular incoming task based upon the relative burden level for such Farm services. An estimate of how long it will take to process the job is sent back to the client. The job is sent to a particular Farm service, and the Farm service provides an update of the time estimate to complete the job, which in turn is again sent back to the client. The Master Farmer might detect that a job is going to take longer than it should, and thereafter re-estimate how long the job will take, in light of all the other traffic on the system. Clients can also request new estimates.

The chart therefore serves as an indication of how busy the farm is over a given period of time, and/or provides a historical curve of performance for a particular applications, such as Image Alchemy or the like. Over certain time periods, each Field is updating this chart, and the Farm service packages up all this information and updates the Master Farmer with such information. Hence, if a client wants to run Distiller on a file, then an X-Y performance curve for Distiller over a time period, for instance the last few hours, will exist for estimation purposes. If an incoming file is 2 MB, then an estimate can be made regarding processing a file of this size. An important feature of the present systems is that it looks at pending files. If for instance a 600 MB file were pending, then estimates would be adjusted accordingly. The chart is analyzed for each Farm in light of the size of the incoming jobs for that Farm. As a result, a job might be shifted and queued up to be fifth in line on a first Farm service, as opposed to first in line on second Farm service, because it has been estimated that the job will run faster despite being fifth in line on the first Farm Service. Hence, regardless of queue position, the time estimate for completion will control the ultimate placement of the job on a Farm service. Both queuing and historical performance estimates are thereby used in deciding which Farm service will handle the job.

It should be noted that Prepress applications are very file intensive. As a result, the system is constantly reading and writing to such files during the course of processing them. This allows estimates on system usage to be based upon system impact assumptions (and predictions) relating to such file usage. For instance, Prepress applications generally have a large impact on the system; and/or a large impact on the network card if the application is reading and writing to the network; and/or a large impact on the drive if the application is reading and writing to the local disk; and so forth along similar relations. Hence, a chart can be constructed regarding system impact. By way of example, if the processor is running at 75% utilization, and job comes in of size "X", then predictions (and/or extrapolations) can be made as to how long it will take to process that particular job. Each Field maintains its own chart of CPU usage versus job size in order to predict how long a job will take. As network (or other such) conditions change, then the chart will be revised. If, for instance, a size "5" job at 75% CPU utilization will take 3 seconds to process, then it might be extrapolated that the same sized job at 50% CPU utilization will only take 2 seconds.

For Prepress applications, the size of the job is generally easy to determine. For instance, if a PostScript file comes into the system having a certain file size, then it is relatively straightforward to estimate how large the resulting PDF file will be. For most Prepress applications, there are generally input files and output files, which follow similar predictive patterns. In other systems—which might host business logic or the like—it is generally difficult to predict the impact that different jobs might have on the general applications server. File (or job) sizes, however, provide for more regular estimation.

The present invention is also configured to introduce little to no overhead in the processing of tasks. Certain speed advantages might be realized by running an application locally on a client machine. However, the present Farm system passes the job request from the Master Farmer to the Farm, and to the Field, and to the Plot, with no significant tradeoffs in speed. Moreover, a very large file might be processed more quickly on the larger machine (or machines) comprising the Farm System, as compared the smaller (less powerful) local machine.

The present Farm system is also easily expandable, wherein each of the Farm services can be configured to run any of the file processing tasks. If a particular task is very resource intensive, it can be ran alone on the system. When each Farm service tells the Master Farmer that is running and ready for tasks, it also identifies the tasks that it is servicing. Adding of new file processing tasks is as simple as placing the new Field and Plot on a machine, and in a particular directory.

COLOR WASHING

Color washing is described in the above referenced provisional application No. 60/152,521. The more generalized process of washing is a process for manipulating encapsulated PostScript (EPS) files and producing a file in a consistent format for use by other applications. Washing is one of many Prepress operations that can be automated by hosting the associated application on a server or other networked computer. In general, a client application communicates with the Master Farmer and requests the Master Farmer service to perform certain tasks. For example, the client might ask the Master Farmer to take a PostScript file and convert it into a PDF file. Additionally, the client might request that the PDF file be converted into an EPS file. Each such job or task will carry with it a different set of parameters. Additionally, the job will operate on a source file and produce a destination file. In the present system, these files are stored in the Asset Management File Server (AMFS).

Figure 8:
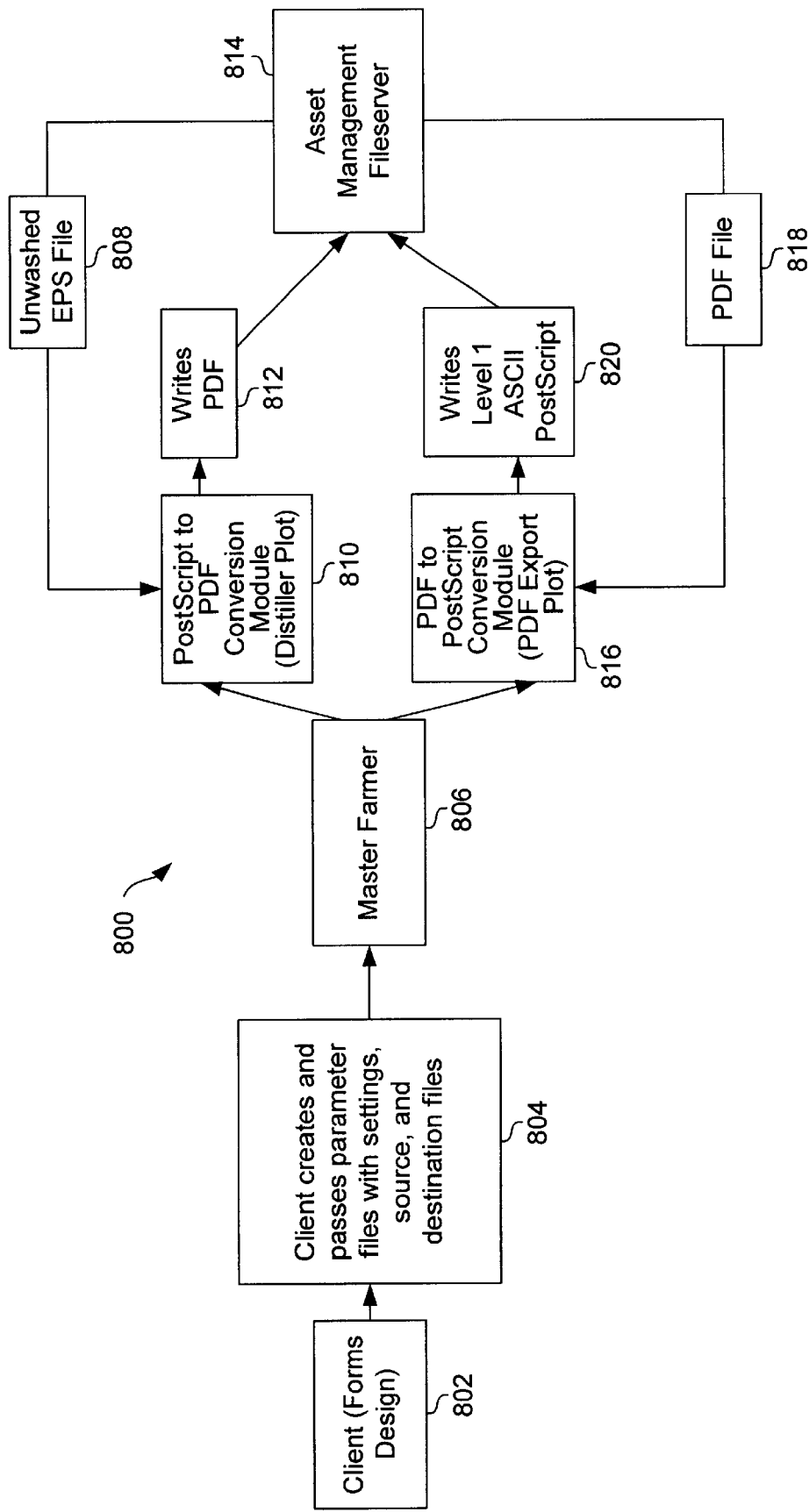
FIG. 8 illustrates, according to one aspect of the present invention, certain representative steps used in performing the washing operation.

Referring now to FIG. 8, a block (or flow) diagram 800 is shown of certain representative elements used in the color washing process. In step 802, the client forms and specifies a design that the client wishes to have washed. In step 804, the client creates and passes parameter files with certain settings. The source and destination files are created and stored on the Asset Management File Server. Each Farm service functions essentially as a large file processor, and will take input parameters that point to stored source and destination files. As such, the client will place an unwashed EPS file on the AMFS, and provide directions and input parameters for a Plot (or washing module) to perform a certain operation on the file.

The washing process (as shown) utilizes two Plots, or conversion modules 810 and 816. First, a Level 2 or Level 3 PostScript file is supplied as the source file. This file may have many embedded problems, such as multiple embedded EPS files. The unwashed EPS file 808 is retrieved from the AMFS 814 and used by the PostScript to PDF conversion module 810, or Distiller Plot, to RIP the file and break it down into a known (or public) format. The Distiller Plot 810 then writes the resulting PDF file 812 back onto the AMFS 814.

The PDF to PostScript conversion module 816, or PDFExport Plot, thereafter retrieves the PDF file 818 from the AMFS 814. This routine or function is part of a PDF Library of routines, any of which might be used to perform operations on certain source or destination files. In the present instance, the PDFExport routine takes the PDF file 818 from the AMFS 814, and writes an ASCII Level 1 Postscript file (which is a "washed" EPS file) as shown in block 820. This resulting Level 1 file is stored on the AMFS 814 in the specified destination file location.

The client communicates with the Master Farmer 806 through a specific set of parameters. The client essentially supplies the input files and the desired location for the output files. A collection of settings are supplied regarding how to create the output file. The AMFS serves as common storage. The client stores the unwashed EPS file (i.e a raw PostScript file) on the AMFS before invoking this series of steps (in FIG. 8, or otherwise) by talking to, or interacting with, the Master Farmer. The resulting washed EPS file will be embedded in the final PRF file.

In the present system, the process is automated. The PDF file is created with pre-defined settings from the unwashed EPS file. The PDF file is thereafter converted into the Level 1 ASCII PostScript format. In a prior art Prepress environment, the user of the Distiller program would set up their own local parameters to run Distiller (or the like). Similar local parameters would be used in converting (or exporting) PDF to PostScript to form the washed EPS. As such, the user would control (among other things) the fonts, letting, turning, setting, scaling, and the like. This level of unguided user control makes for irregular results. The present system, however, provides a consistent and pre-defined method for manipulation of the file. The referential integrity (or consistent color settings) are the result of the normalization (or washing) process that permits applications to run in an automated environment, wherein the color settings are set as policies. Policies are input parameters for processing of the files, i.e., whether the files are going to have font subsetting, or whether the fonts are going to be embedded, and the like. These policies are managed, updated, and tested automatically.

In more detail, an EPS file goes through the Distiller (under control of the PostScript to PDF conversion module 810), which simply turns the PostScript into PDF. Distiller has the capability to convert any PostScript file to PDF format. Exceptions exist, however, including files with duotones where RIP specific device transfer functions are used. Print graphics are converted to PDF format unchanged. Preview graphics are downsampled (changing their dpi values for images) and converted to RGB color space using Distiller parameters. Preview graphics are manipulated to force them to smaller sizes to facilitate viewing over the IOPC (or similar device). Distiller allows control of internal parameters used in conversion to PDF format by placement of Distiller specific operators in PostScript files.

Essentially, the PostScript to PDF conversion module 810 (the hosted application), writes a new PostScript file containing the Distiller-specific parameters and links to the target EPS file(s) being washed. A table of parameters are shown, with certain representative settings, in Appendix A. These parameters are the policies to be used in color settings, and the like. Notably, an API (application program interface) is a specific interface prescribed by a computer operating system or by an application program by which a programmer writing a client program can make requests of the operating system or other application. Appendix A represents the custom parameters of an API, with settings that may be specified for Print and Preview graphics according to the present color washing process.

The resulting PDF file is exported back into EPS format using the Adobe PDF library as a Level 1 ASCII PostScript file. The Adobe PDF library exposes functionality through use of an API. This exposed functionality is used by the PDF to PostScript conversion module 816 (a hosted application), to control EPS output. The settings are stored in a structure and there is a user-defined type with parameters, these parameters becoming the actual variable names. The variables are placed in the structure with values and then a particular function is called. In the present instance, customer parameters may be specified for print and preview graphics with reference to the API listed in Appendix B. The function call used to export the PDF file format to EPS file format in the PDF library is "PDFLPrintPDF." This function definition is as follows:

ACEX1 void ACEX2 PDFLPrintPDF (PDDoc pdDoc, SPathName pathName, PDPrintParams psparams).

The structure holding the parameters for the function call is named "PDPrintParamsRec." Each of the values listed in the washing parameters of the API of Appendix B (e.g., incBaseFonts, PDInclusion, incEmbeddedFonts, etc.) are members of this structure. The aforementioned PDF library is very large, with thousands of functions available to clients. The present solution uses one such function with the same parameter names as defined by the PDF Library. Hence, a programmer familiar with the Adobe PDF library would find these same parameter names for this function.

A comparative table can be created which allows the process to automatically determine and convert setup parameters for the particular application. When parsing through a PostScript file, settings can be determined which are "off" and "on." The present system allows conversion of the set parameters to ones that will ultimately be used by the system. For instance, for creating a Print file there are certain policies that will be used. For creating a Preview file, still other policies will be used.

Moreover, once this table is established, validation can be performed in the system of the file to be viewed or printed. The image (or image asset) that is ultimately going to be displayed or printed is the one that is valid in the ILIAD database. The image is valid because the process described herein has been performed properly, and the results are stored for access by a variety of applications. On a client based system, a client might perform color washing, color separation, or trapping on the image themselves. As such, there would be no record regarding how the file was prepared. The present system provides such a record, so that whatever else is done with the image, it can be validated that the proper image has been pulled from ILIAD and used to generate previews onscreen or printed documents. Hence, a number of other applications can use ILIAD and this type of process to validate the images they are using, as well as processing them. The recorded Metadata about images in a particular job can be reused.

Validation of inks is accomplished by parsing the standard exchange output PostScript file. Inks inside the file are located and recorded. The inks are then checked against inks in a database, and also against their low resolution/high resolution counterparts. In pre-washed EPS files in the prior art, the various inks in the file can be located in different (and inconsistent) places throughout the file output structure. The present invention provides a significant advantage over such prior art systems, in that it would be extremely difficult to find and record inks in such a pre-washed prior art EPS file.

The size of the low resolution graphics can also be manipulated by using the Distiller down-sampling capabilities. Distiller exposes an API which can be used for manipulating the dpi (dots per inch) values of color, black and white, and grayscale images.

It is important the this process be performed on a hosted system because if not, it would be difficult to determine which settings are stored in default files on various client machines. Consistent results could not be achieved. Moreover, no information could be stored in a master system in order to make sure that all related processing of such files follows certain color parameters. If a variety of client machines were used, then many variations would result as persons might change certain settings, and/or files might be altered or eliminated. The present invention provides for maintaining the application centrally and in a controlled fashion so that applications can be used to generate a consistent output.

The present process may be embedded with any suitable application, such as a Forms Design application, or the like. In general, it makes no difference who is asking for the washing to be performed. Any application, such as a web site design tool, that manipulates color images may so benefit. For instance, a web site user interface might be used to create the washed EPS files. If a user were hosting a website, and wanted to use the herein mentioned system to produce the correct logo for a client, an appropriate function call could be made. The network connection with the AMFS would allow access to a stored bitmap image, or printed document, and the appropriate level of the image could thereby be generated.

In the present example, the chosen client application is a product setup module 409 (or tool) for creating new business cards and the like. The module is shown running on the web server 408, but might similarly be processed at the customer computer 404, or elsewhere. The client might use a business card development application called "Forms Design" or the like. The same process could similarly be coded into other types of client applications. Clients might even author their own documents, using their own layout tools or third party layout tools. The process could be inserted into the middle of existing (or other types of) applications, with the results being merged for viewing documents, or for storing documents. The present product setup module utilizes the benefits of the present invention by feeding back a viewable image so that a proof of the business card can be generated with the washed imagery therein.

When adding a new template to the product setup module 409, the process will wash the EPS automatically and report if the EPS contains any colors not in the ILIAD database, or if the colors are spelled differently from their ILIAD counterparts. If the color information is incorrect, the product setup module 409 will not allow the graphic into the system until it is corrected. The product setup module will import the color information into ILIAD only if it correctly identifies the colors in the EPS file created by module 816. When creating Print Ready Files, the system will preferably not accept unwashed EPS files. As a result, no unwashed graphics are used in such a system.

Figure 9:
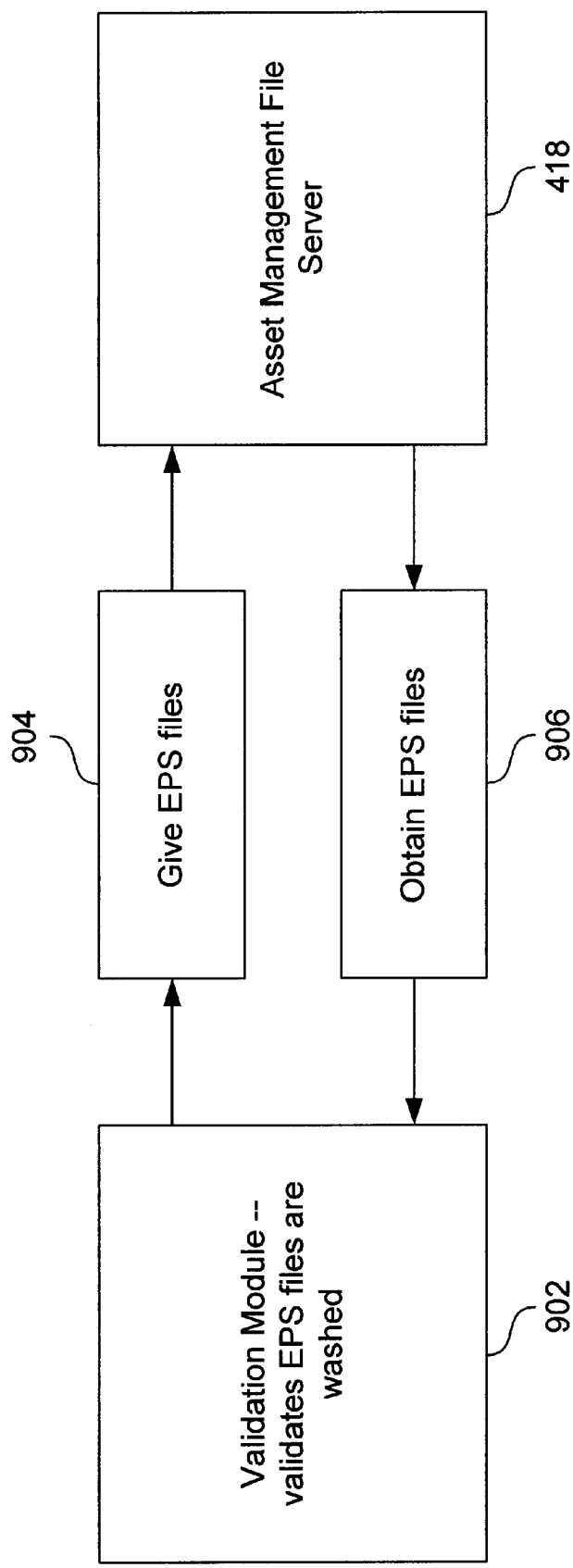
FIG. 9 illustrates, according to one aspect of the present invention, certain representative steps for validating EPS files by the rendering engine.

FIG. 9 shows validation of such EPS files. A validation module 902 is shown giving or providing unwashed EPS files 904 to the Asset Management File Server (AMFS) 908. This validation module might include a rendering engine, or the like. The process described above washes the EPS file and the validation module 902 obtains the washed EPS files 906 from the AMFS 418. The rendering engine 1102 thereafter validates that the EPS files are washed, and will not accept such unwashed files.

Figure 10:
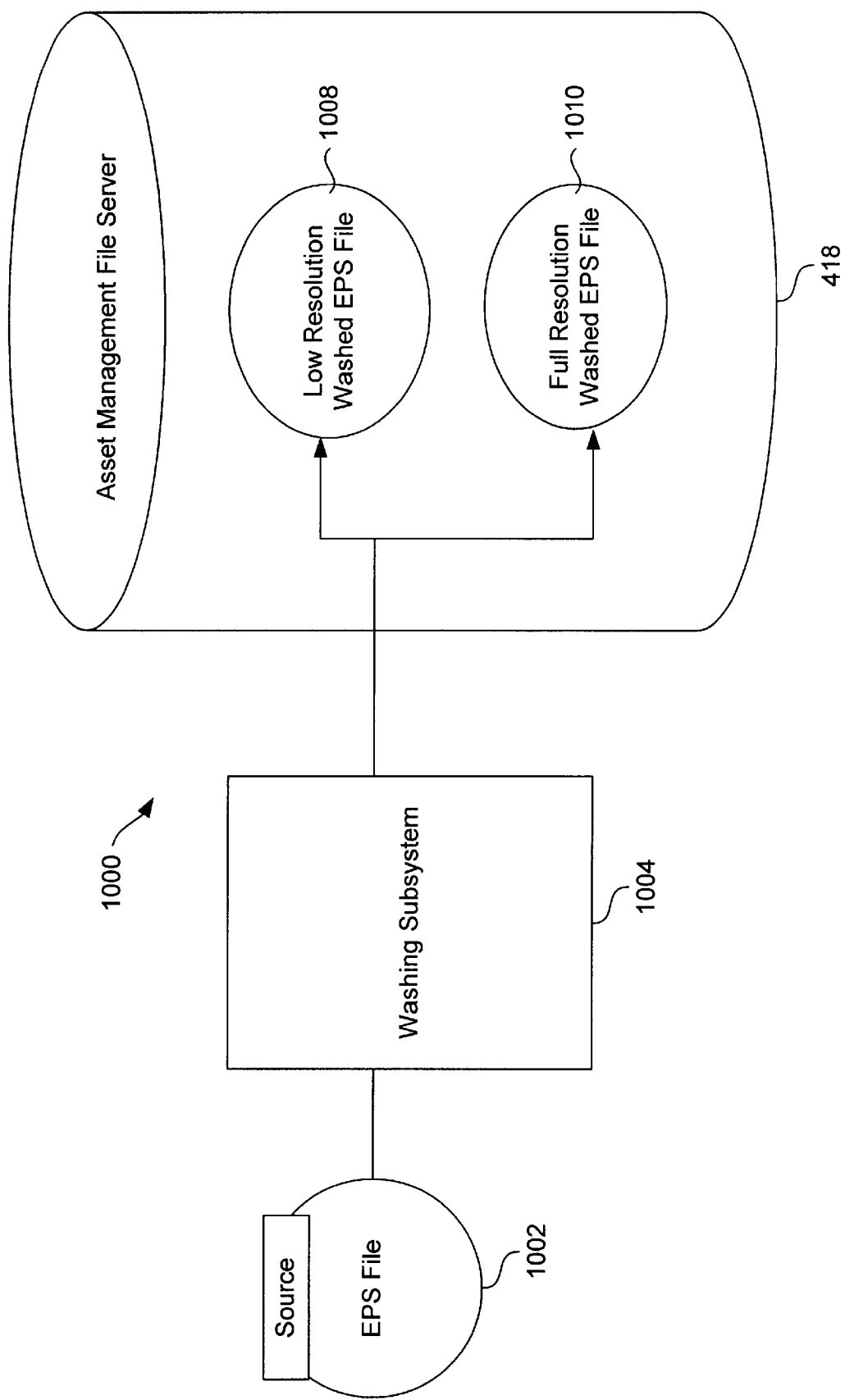
FIG. 10 illustrates, according to one aspect of the present invention, a block diagram of elements used to provide both low resolution and high (full) resolution washed EPS files.

As also further detailed in the referenced applications, "high resolution" refers to graphics that are actually sent to a vendor's imagesetter at the time for printing. "Low resolution" refers to graphics that are previewed by customers from the IOPC web site (or OPC module), in the place of their high resolution counterparts. High resolution graphics can be extremely large and would be very unwieldy for viewing over the limited bandwidth connections that many customers use. Referring now to FIG. 10, a block diagram 1000 is shown of certain representative elements used to create washed low and high resolution EPS files. A source EPS file 1002 is shown being directed into washing subsystem 1204. The washing subsystem can be used to create either a lower resolution washed EPS file 1208, or a full (or high) resolution washed EPS file 1210. As mentioned above, these washed files are stored on the AMFS 418.

Figure 11:
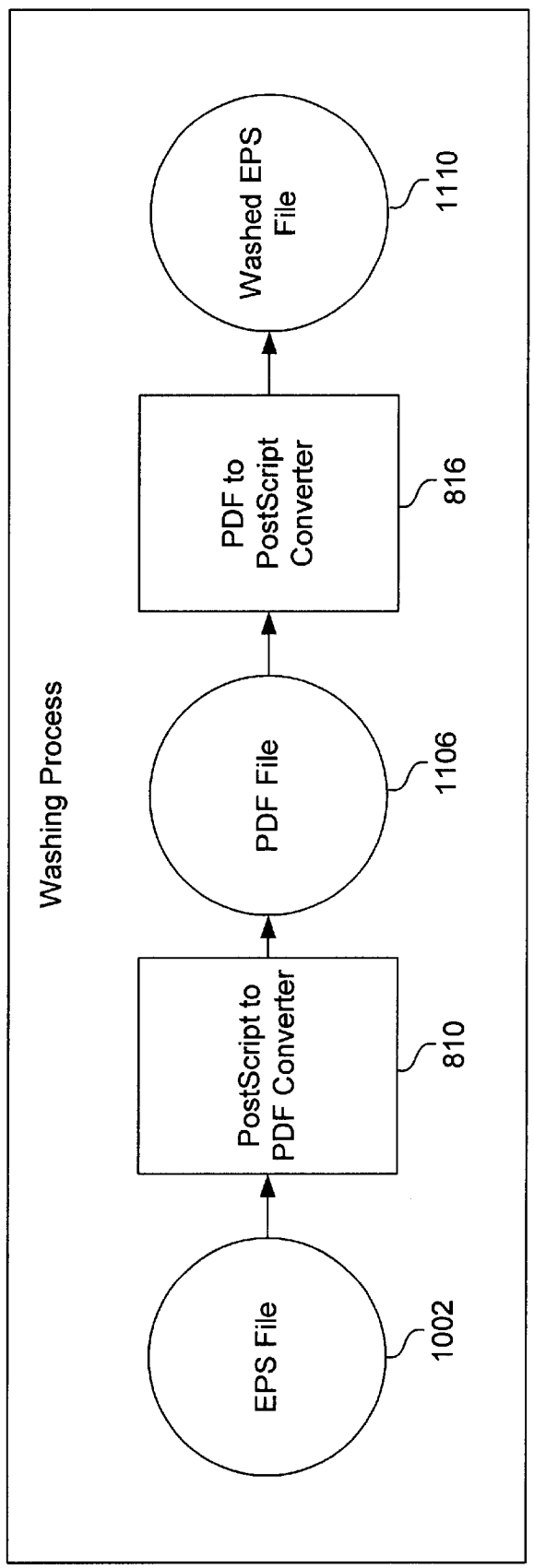
FIG. 11 illustrates, according to one aspect of the present invention, a block diagram of representative elements in the washing process block of FIG. 10.

Referring now to FIG. 11, a portion of the washing subsystem 1004 of FIG. is shown in further detail. The source EPS file 1102 is fed into a PostScript to PDF conversion module 810. A PDF file 1106 results (as stored on the AMFS). The PDF file is fed into the PDF to PostScript conversion module 816. The washed EPS file 1110 results, and is stored on the AMFS.

Figure 12:
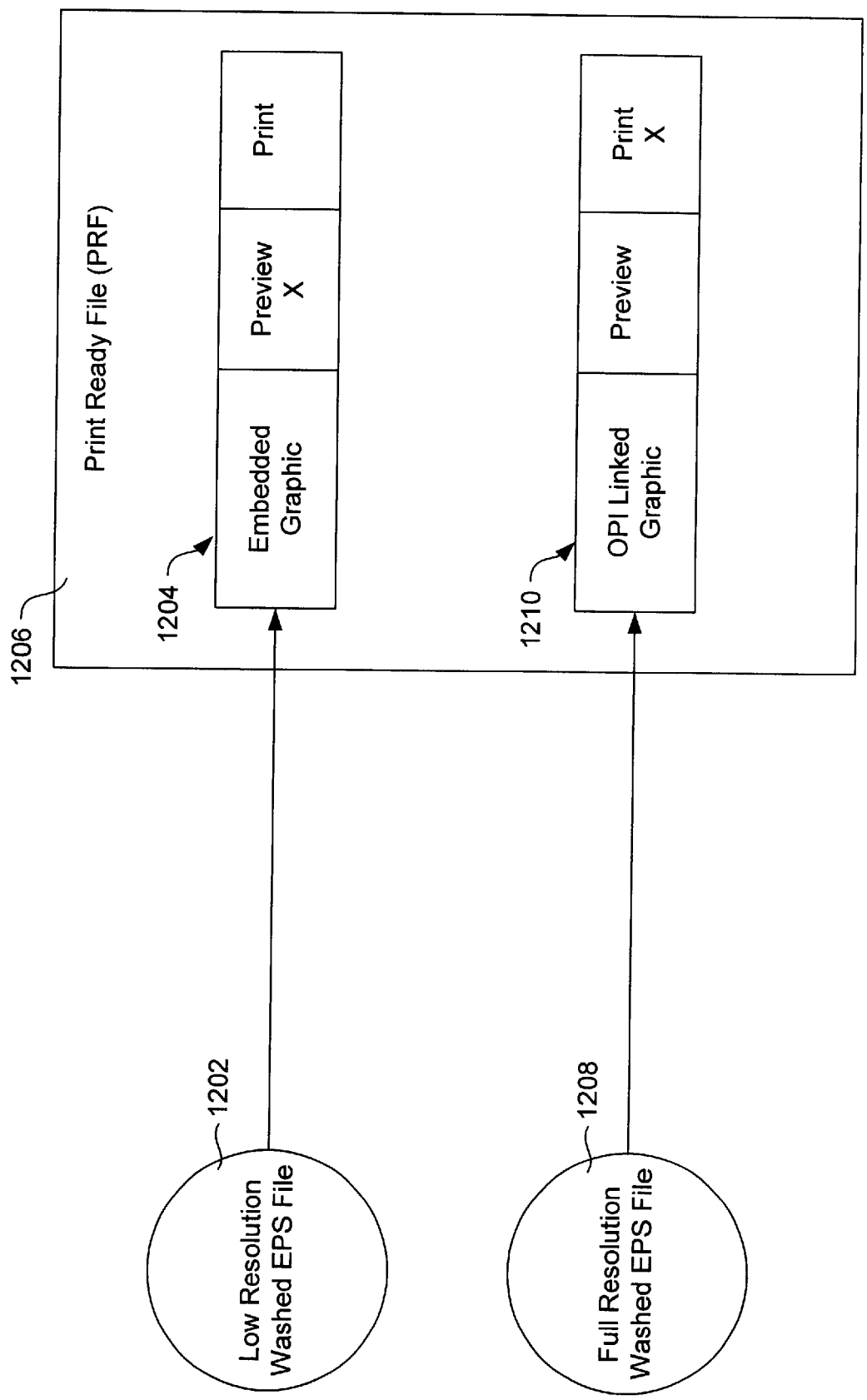
FIG. 12 illustrates, according to one aspect of the present invention, a block diagram of the relationship between the low resolution and high (full) resolution washed EPS files and the Print Ready File.

FIG. 12 shows the flag settings for use in a consistent PostScript file (or PRF 1206) to select wash/validate/preview (low resolution) or print (high resolution). For the low resolution washed EPS file 1202, the associated flag settings 1204 include an embedded graphic element, and the Preview flag is set. For the full resolution washed EPS file, associated flag settings 1210 include an OPI linked graphic element, and the Print flag is set.

FIG. 13 shows an example of a Document Structuring Convention (DSC) header for an unwashed EPS file (with an EPS file embedded in it). FIG. 14 shows an example of a washed Print EPS file header and footer. Note that a normalized bounding box and additional colors are now shown in the DSC comments for the file. DSC comments are shown with a leading "%%" sign. Regular PostScript comments are preceded with a leading "%" sign. DSC comments are published by Adobe so that anyone looking at a particular file can find the bounding box, or other standard Postscript information, and appropriately read it.

The contrasting header/footers in FIGS. 13 and 14 show the differences between a washed and an unwashed EPS file. For instance, in the unwashed file, black was the only color showing in the DSC documented color comments. The EPS file actually has another EPS file embedded in it, which has three process colors. In the unwashed EPS example, the application which created the file created it improperly. Since the comments are not necessary to have the file processed by the PostScript interpreter, the application wrote the colors incorrectly. After washing, the colors magenta, yellow, and black are also shown. Hence after washing, this necessary information from the internal PostScript files is moved into the DSC comments outside. One of the major reasons for washing is that a PostScript interpreter is needed in order to learn all the colors that are within the document. Distiller is such a PostScript interpreter, so when the file is rewritten via the PDF to PostScript conversion module 816, the file will have the proper colors. A user of the file can thereafter look at the header or footer and know the colors involved in printing (or viewing) the document.

Users might also generate EPS files with any random application (i.e., Freehand, Photoshop, or the like). Such users might generate these files improperly, and such files would need to be parsed specifically for every possible variation. For instance, an outside PostScript file might have one font in it, and an inside PostScript file might have another four or five other fonts embedded in it. The outside comments would not show those internal fonts unless washing were performed to correct such comments. Still another benefit of washing is that the fonts are identified and the file can be rejected if the proper font is not found. The present system preferably requires that all the files have the necessary fonts included within them, and that such files cannot refer to any outside documents.

Creating bitmaps of the unwashed/washed files should show no differences in the visible appearance of the files. Washing should generally only produce differences regarding the file's internal structure. An exception is the Preview file, which is downsampled. Differences might exist if the user is looking at washed preview downsampled images for a source EPS file that was a rastered file, and the source had significantly larger dots per inch (dpi) than the downsampled version. This preview file might look slightly "worse" than the print image. The desired result of washing would be for the file to look identical to the human eye. Washing should not affect the quality or actual image that comes out. It is important to the customer using the system that the output looks essentially the same.

Additionally, the aforementioned policies (see Appendices A and B) might readily be changed to accomplish other end results. For example, more policies might be added, or existing ones removed. Also, if it were desired to generate level 2 PostScript for a vendor, the policies could readily be changed to accomplish this. The image resolution might also be changed. The policies are therefore specifically defined for a particular set of needs. If different file formats are needed, the policies would be changed to accommodate the new file format. If such new file formats were required, then the policies would be predefined in order to generate consistent file formats. All files of that type would then be generated according to the predefined policies. The central hosting of this type of metadata allows for changes in the file format to be recorded as to what types of jobs are affected. On the print management side (i.e. the ILIAD side of the system), such changes can be tracked.

Although the foregoing invention has been described in some detail for purposes of clarity of understanding, it will be apparent that certain changes and modifications may be practiced within the scope of the appended claims. For instance, the computer may function as a server or the like. Therefore, the described embodiments should be taken as illustrative and not restrictive, and the invention should not be limited to the details given herein but should be defined by the following claims and their full scope of equivalents.

What is claimed is:

1. A method to normalize the information in an encapsulated PostScript (EPS) file within an automated printing system, the method comprising:

receiving a request from a client software application to normalize said EPS file;

receiving said EPS file;

receiving a first set of predefined parameter settings;

automatically converting said EPS file to a Portable Document Format (PDF) file using said first set of predefined parameter settings;

receiving a second set of predefined parameter settings; and automatically converting the PDF file to a normalized EPS file having a consistent format for the information therein using said second set of predefined parameter settings, whereby a variety of software applications may use the information therein to access the normalized EPS file in said automated printing system.

2. The method of claim 1, wherein said method for the normalization of the information in said EPS file is performed as an automated, hosted Prepress application.

3. The method of claim 1, wherein the normalized EPS file is a Level 1 PostScript file.

4. A method as recited in claim 1 wherein said first and second sets of predefined parameter settings include color settings, whereby said normalized EPS file includes a consistent format for color information.

5. A method as recited in claim 1 wherein said step of converting said EPS file includes
using a PostScript interpreter to convert said EPS file.

6. A method as recited in claim 1 wherein said step of converting the PDF file includes
using a PDF library to convert said PDF file.

7. A method as recited in claim 1 wherein said first and second sets of predefined parameter settings are stored in a database accessible by said automated printing system, and said method further comprises:
retrieving said first and second sets of predefined parameter settings from said database.

8. A method as recited in claim 1 wherein said EPS file, said PDF file and said normalized EPS file are stored on a file server accessible by said automated printing system.

9. A method as recited in claim 1 wherein a first conversion software module controls said step of automatically converting said EPS file, and wherein a second conversion software module controls said step of automatically converting the PDF file, whereby said method is performed automatically.

10. A method as recited in claim 7 wherein said first and second sets of predefined parameter settings represent a set of policies regarding the normalization of said EPS file.

11. A method as recited in claim 1 wherein said first and second sets of predefined parameter settings are defined to enable the preview of said normalized EPS file or the printing of said normalized EPS file.

12. A method to normalize the color information in an encapsulated PostScript (EPS) file within an automated printing system, the method comprising:
predefining settings for color parameters and storing these color settings in a database accessible by said automated printing system;
receiving a request from a client software application to normalize said EPS file;
receiving said EPS file;
retrieving a first set of said color settings from said database;
converting said EPS file to a Portable Document Format (PDF) file using said first set of color settings;
retrieving a second set of said color settings from said database; and
converting said PDF file to a normalized EPS file using said second set of color settings, whereby consistent color settings are maintained for said normalized EPS file.

13. The method of claim 12, wherein said method for the normalization of the color information in said EPS file is performed as an automated, hosted prepress application.

14. The method of claim 12, wherein the normalized EPS file is a level 1 PostScript file.

15. A method as recited in claim 12 wherein said step of converting said EPS file includes using a PostScript interpreter to convert said EPS file.

16. A method as recited in claim 12 wherein said step of converting the PDF file includes using a PDF library to convert said PDF file.

17. A method as recited in claim 12 wherein said EPS file, said PDF file and said normalized EPS file are stored on a file server accessible by said automated printing system.

18. A method as recited in claim 12 further comprising:
parsing said normalized EPS file and said consistent color settings;
locating inks used in said normalized EPS file; and
comparing said located inks against a database of inks to validate said located inks;
whereby said normalized EPS file allows said validation to be performed.

19. A method as recited in claim 12 wherein a first conversion software module controls said step of converting said EPS file, and wherein a second conversion software module controls said step of converting said PDF file, whereby said method is performed automatically.

20. A method as recited in claim 12 wherein said first and second sets of color settings represent a set of policies regarding the normalization of said EPS file.

21. A method as recited in claim 12 wherein said first and second sets of color settings arc defined to enable the preview of said normalized EPS file or the printing of said normalized EPS file.

22. A method to normalize an encapsulated PostScript (EPS) file, the method comprising:
determining policies for normalizing said EPS file;
saving said policies as parameter settings in a database;
receiving a request from a client software application to normalize said EPS file;
retrieving a first set of said parameter settings from said database;
automatically executing a first conversion software module to convert said EPS file to a Portable Document Format (PDF) file using said first set of parameter settings;
retrieving a second set of said parameter settings from said database; and
automatically executing a second conversion software module to convert said PDF file to a normalized EPS file using said second set of parameter settings, whereby said method performs said normalization automatically.

23. A method as recited in claim 22 wherein said parameter settings are defined to enable the preview of said normalized EPS file or the printing of said normalized EPS file.

24. A method as recited in claim 22 wherein said method is performed as a hosted Prepress application.

25. A method as recited in claim 22 wherein said normalized EPS file is a Level 1 PostScript file.

26. A method as recited in claim 22 wherein said parameter settings include color settings, whereby said normalized EPS file includes a consistent format for color information.

27. A method as recited in claim 22 wherein said step of automatically executing a first conversion software module includes
using a PostScript interpreter to convert said EPS file.

28. A method as recited in claim 22 wherein said step of automatically executing a second conversion software module includes
using a PDF library to convert said PDF file.

29. A method as recited in claim 22 wherein said EPS file, said PDF file and said normalized EPS file are stored on a file server accessible by said first and second conversion software modules.

* * * * *